(12) United States Patent
Zhu et al.

(10) Patent No.: US 12,739,343 B2
(45) Date of Patent: Sep. 15, 2026

(54) VIDEO PROCESSING METHOD AND SYSTEM, VIDEO PLAYBACK SYSTEM, APPARATUS, DEVICE, AND MEDIUM

(71) Applicant: BOE Technology Group Co., Ltd., Beijing (CN)

(72) Inventors: Dan Zhu, Beijing (CN); Xuan Sun, Beijing (CN); Xiaotian Jiang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 195 days.

(21) Appl. No.: 18/702,007

(22) PCT Filed: Aug. 30, 2023

(86) PCT No.: PCT/CN2023/115689
§ 371 (c)(1),
(2) Date: Apr. 17, 2024

(87) PCT Pub. No.: WO2025/043518
PCT Pub. Date: Mar. 6, 2025

(65) Prior Publication Data
US 2025/0233961 A1 Jul. 17, 2025

(51) Int. Cl.
*H04N 7/10* (2006.01)
*G06T 1/60* (2006.01)
(Continued)

(52) U.S. Cl.
CPC ............... *H04N 7/104* (2013.01); *G06T 1/60* (2013.01); *G06T 3/4053* (2013.01); *G06T 7/174* (2017.01);
(Continued)

(58) Field of Classification Search
CPC .... H04N 7/104; H04N 7/0117; H04N 13/139; H04N 13/305; H04N 2013/0081;
(Continued)

(56) References Cited

U.S. PATENT DOCUMENTS 8,928,729 B2 * 1/2015 Schnyder ............. H04N 13/264 348/43
10,860,273 B2 * 12/2020 Han ................. H04N 21/43076
11,095,890 B2 * 8/2021 Chen .................... H04N 19/426
11,195,318 B2 * 12/2021 Suma .................... G06T 15/005
(Continued)

FOREIGN PATENT DOCUMENTS

CN 101697113 A 4/2010
CN 105141876 A 12/2015
(Continued)

*Primary Examiner* — Helen Shibru
(74) *Attorney, Agent, or Firm* — WHDA, LLP

(57) ABSTRACT

Provided is a video processing method and system, a video playback system, an apparatus, a device, and a medium in the technical field of video processing, and the method includes: acquiring an input video frame and display parameters of the input video frame when it is displayed, the display parameters including at least one of a video format and a resolution; processing the input video frame into a plurality of output video frames based on the display parameters, each output video frame corresponds to a partial region of the input video frame; and displaying the plurality of output video frames on a plurality of display devices so that the plurality of output video frames are displayed according to the display parameters.

19 Claims, 14 Drawing Sheets

(51) Int. Cl.

| | |
|---|---|
| ***G06T 3/4053*** | (2024.01) |
| ***G06T 7/174*** | (2017.01) |
| ***H04N 7/01*** | (2006.01) |
| ***H04N 13/139*** | (2018.01) |
| *H04N 13/00* | (2018.01) |
| *H04N 13/305* | (2018.01) |

(52) U.S. Cl.

CPC ......... *H04N 7/0117* (2013.01); *H04N 13/139* (2018.05); *G06T 2207/10021* (2013.01); *G06T 2207/20021* (2013.01); *H04N 2013/0081* (2013.01); *H04N 2013/0092* (2013.01); *H04N 13/305* (2018.05)

(58) Field of Classification Search

CPC ......... H04N 2013/0092; H04N 13/268; H04N 21/440263; H04N 5/262; G06T 1/60; G06T 3/4053; G06T 7/174; G06T 2207/10021; G06T 2207/20021; G06F 3/1446; G06F 3/14

USPC ............................................................ 348/43

See application file for complete search history.

(56) References Cited

U.S. PATENT DOCUMENTS

| | | | | |
|---|---|---|---|---|
| 11,399,143 | B2 * | 7/2022 | Park | H04N 5/265 |
| 11,538,441 | B2 * | 12/2022 | Lee | G06F 3/1446 |
| 12,033,302 | B2 * | 7/2024 | Tang | G06N 3/09 |
| 12,236,556 | B2 * | 2/2025 | Zhang | H04N 21/2356 |
| 12,293,124 | B2 * | 5/2025 | Griffin | H04N 21/242 |
| 12,406,504 | B2 * | 9/2025 | Li | G06V 10/82 |
| 12,483,615 | B2 * | 11/2025 | Springer | G06F 3/1454 |
| 2018/0013978 | A1 | 1/2018 | Duan et al. | |
| 2021/0020124 | A1 * | 1/2021 | Kenmochi | G09G 3/36 |
| 2022/0253977 | A1 * | 8/2022 | Lyu | G06T 7/40 |
| 2025/0086763 | A1 * | 3/2025 | Zhu | G06T 5/92 |
| 2025/0238128 | A1 * | 7/2025 | Manzari | G06F 3/165 |

FOREIGN PATENT DOCUMENTS

| | | | |
|---|---|---|---|
| CN | 107483913 | A | 12/2017 |
| CN | 111263208 | A | 6/2020 |
| CN | 111459430 | A | 7/2020 |
| CN | 109242869 | B | 2/2021 |
| CN | 113538480 | A | 10/2021 |
| CN | 110517278 | B | 4/2022 |
| JP | 2013-152338 | A | 8/2013 |

* cited by examiner 1 2 3 4 5 6 7 8 9

Super-resolution

1_1 1_2 1_3 1_4

2_1 2_2 2_3 2_4

3_1 3_2 3_3 3_4

9_1 9_2 9_3 9_4

Segmentation

Segmentation 1 2 3 4

Super-resolution

| | | | | | |
|---|---|---|---|---|---|
| 0 | 0 | 0 | 0 | 0 | 0 |
| 0 | 1 | 2 | 3 | 4 | 0 |
| 0 | 5 | 6 | 7 | 8 | 0 |
| 0 | 0 | 0 | 0 | 0 | 0 |

FIG. 7

| | | | | | |
|---|---|---|---|---|---|
| 0 | 0 | 0 | 0 | 0 | 0 |
| 0 | 1 | 2 | 3 | 4 | 0 |
| 0 | 5 | 6 | 7 | 8 | 0 |
| 0 | 0 | 0 | 0 | 0 | 0 |

Segmentation

| | | | |
|---|---|---|---|
| 0 | 0 | 0 | 0 |
| 0 | 1 | 2 | 0 |
| 0 | 0 | 0 | 0 |

| | | | |
|---|---|---|---|
| 0 | 0 | 0 | 0 |
| 0 | 3 | 4 | 0 |
| 0 | 0 | 0 | 0 |

| | | | |
|---|---|---|---|
| 0 | 0 | 0 | |
| 0 | 5 | 6 | 0 |
| 0 | 0 | 0 | 0 |

| | | | |
|---|---|---|---|
| 0 | 0 | 0 | 0 |
| 0 | 7 | 8 | 0 |
| 0 | 0 | 0 | 0 |

FIG. 8

VIDEO PROCESSING METHOD AND SYSTEM, VIDEO PLAYBACK SYSTEM, APPARATUS, DEVICE, AND MEDIUM

TECHNICAL FIELD

The present disclosure relates to the technical field of video processing, and in particular to a video processing method and system, a video playback system, an apparatus, a device, and a medium.

BACKGROUND

With the rise of Internet technology and multimedia technology, various types of videos, such as advertisements, movies and TV dramas, promotional information, and monitoring videos, are often played on terminal devices. In a media control scenario, a video is split and then displayed on a plurality of display devices, and different display devices play different images split out in the video.

SUMMARY

The present disclosure provides a video processing method, including:

acquiring an input video frame and display parameters of the input video frame when the input video frame is displayed, wherein the display parameters include at least one of a video format and a resolution;

processing the input video frame into a plurality of output video frames based on the display parameters, wherein each of the output video frames corresponds to a partial region of the input video frame; and displaying the plurality of output video frames on a plurality of display devices respectively, so that the plurality of output video frames are displayed according to the display parameters.

Exemplarily, the processing the input video frame into a plurality of output sub-video frames based on the display parameters includes:

acquiring input parameters of the input video frame, wherein the input parameters include at least one of the video format and the resolution;

performing at least one image processing on the input video frame in sequence based on the input parameters and the display parameters, wherein the image processing includes a segmentation processing for segmenting a current video frame into a plurality of sub-video frames;

wherein the plurality of sub-video frames correspond to the plurality of output video frames, respectively; the current video frame is the input video frame or a video frame obtained by performing an image processing other than the segmentation processing on the input video frame.

Exemplarily, the input parameters include the video format; the performing at least one image processing on the video frame in sequence based on the input parameters and the display parameters includes:

performing a format conversion processing on the input video frame when the video format is different from the video format of the input video frame, wherein the format conversion processing is used for converting the input video frame into a first video frame complying with the video format in the display parameters; and obtaining the plurality of output video frames by performing the segmentation processing on the first video frame.

Exemplarily, a video format of the input video frame is a two-dimensional video format, a video format of the output video frame is a three-dimensional video format; and the performing a format conversion processing on the input video frame includes:

acquiring a depth map corresponding to the input video frame; and generating sub-video frames corresponding to a plurality of viewpoints based on a depth value of each pixel in the depth map and a pixel value of each pixel in the input video frame, wherein the sub-video frame corresponding to each viewpoint includes pixels at a plurality of positions for the viewpoint.

Exemplarily, the first video frame includes a plurality of viewpoints and pixels at a plurality of positions for each of the viewpoints; the obtaining the plurality of output video frames by performing the segmentation processing on the first video frame includes:

dividing, according to a splicing manner of the plurality of display devices, a plurality of pixels included in each viewpoint to obtain pixels included in different region positions of each viewpoint; and splicing pixels belonging to the same region position in the plurality of viewpoints to obtain output video frames corresponding to a plurality of region positions respectively.

Exemplarily, the display parameters include the resolution; the at least one image processing further includes a super-resolution processing; and the performing at least one image processing on the video frame in sequence based on the input parameters and the display parameters includes:

determining execution orders of the segmentation processing and the super-resolution processing based on a video format of the output video frame when a resolution of the output video frame is higher than the resolution of the input video frame, wherein the super-resolution processing is used for improving the resolution of the input video frame;

performing, when the super-resolution processing is to be executed, the super-resolution processing on an input second video frame according to the resolution of the output video frame, wherein the second video frame is the input video frame or the sub-video frame.

Exemplarily, the determining execution orders of the segmentation processing and the super-resolution processing based on a video format of the output video frame includes:

determining that the execution order of the segmentation processing precedes the execution order of the super-resolution processing when the video format of the output video frame is a two-dimensional video format; and determining that the execution order of the segmentation processing lags behind that of the super-resolution processing when the video format of the output video frame is a three-dimensional video format.

Exemplarily, the video format of the output video frame is a three-dimensional video format; an execution order of the segmentation processing lags behind that of the super-resolution processing; and the performing the super-resolution processing on an input second video frame includes:

extracting a sub-video frame belonging to each viewpoint from the second video frame, wherein the sub-video frame of each viewpoint includes pixels at a plurality of positions; and performing a pixel expansion on the pixels in the sub-video frame of each viewpoint;

wherein the segmentation processing is used for rearranging, according to a splicing manner of the plurality of display devices, the pixels in the sub-video frames of each viewpoint subjected to the pixel expansion to obtain the output video frame.

Exemplarily, the video format of the output video frame is a two-dimensional video format; an execution order of the segmentation processing precedes the execution order of the super-resolution processing; and the performing the super-resolution processing on an input second video frame includes:

for each sub-video frame in the plurality of sub-video frames, performing a pixel expansion on pixels included in the sub-video frame to obtain an output video frame corresponding to each sub-video frame.

Exemplarily, the performing a pixel expansion includes:

for each sub-video frame, interpolating at least one circle of first pixels outside a first edge of the sub-video frame to obtain an intermediate sub-video frame, wherein a pixel value of the first pixel is a pre-set value; and performing the pixel expansion on pixels included in each intermediate sub-video frame.

Exemplarily, the video format of the input video frame is a two-dimensional video format; and before performing the pixel expansion, the method further includes:

interpolating at least one circle of second pixels outside a second edge of the input video frame to obtain a third video frame, wherein a pixel value of the second pixel is a pre-set value; and performing the segmentation processing on the third video frame to obtain the plurality of sub-video frames;

wherein the first edge is an edge in the sub-video frame other than the second edge.

Exemplarily, the input video frame includes a plurality of video frames, and the method further includes:

caching the plurality of input video frames and output video frames corresponding to each of the plurality of input video frames to display the output video frames in sequence according to a frame sequence of the output video frames; and the method further includes:

in response to an adjustment operation on the display parameters, determining a target video frame to be adjusted based on changes of the display parameters before and after the adjustment, wherein the target video frame is a cached input video frame or a cached output video frame; and processing the target video frame to obtain a video frame complying with the adjusted display parameters.

Exemplarily, the determining a target video frame to be adjusted based on changes of the display parameters before and after the adjustment includes:

taking the cached output video frame as the target video frame when the changes represent changes in the resolution, wherein the cached output video frame is an output video frame to be displayed at a current moment; and taking the cached input video frame as the target video frame when the changes represent other changes other than the changes in the resolution.

Exemplarily, the processing the target video frame to obtain a video frame complying with the adjusted display parameters includes:

in response to the target video frame being the output video frame, processing a resolution of the cached output video frame according to the adjusted display parameters to obtain an output video frame with a changed resolution; and in response to the target video frame being the cached input video frame, processing the cached input video frame into a plurality of new output video frames based on the adjusted display parameters.

A second aspect of the present disclosure provides a video processing system, including a scheduling unit, an image processing unit, and a display unit, wherein the scheduling unit is configured to schedule an input video frame to the image processing unit;

the image processing unit is configured to process the input video frame into a plurality of output video frames based on display parameters of the input video frame when the input video frame is displayed, wherein each output video frame corresponds to a partial region in the input video frame, and the display parameters include at least one of a video format and a resolution; and the display unit is configured to display the plurality of output video frames on a plurality of display devices respectively, so that the output video frames are displayed according to the display parameters.

Exemplarily, the image processing unit includes a plurality of image processing modules;

the scheduling unit is configured to:

determine, based on input parameters and the display parameters of the input video frame, at least one target image processing module to be scheduled among the plurality of image processing modules and an execution order of target image processing modules; and schedule, in a scheduling process, a video frame processed by a previous target image processing module to a next target image processing module according to the execution order, wherein a scheduled target image processing module includes a segmentation module for segmenting a video frame input to the segmentation module into a plurality of sub-video frames, wherein the plurality of sub-video frames correspond to the plurality of output video frames, respectively.

Exemplarily, the target image processing module includes a format conversion module and the segmentation module when the video format of the input video frame is different from a video format of the output video frame;

wherein a scheduling order of the format conversion module precedes that of the segmentation module, and the format conversion module is configured to convert the input video frame into a video frame complying with the video format in the display parameters.

Exemplarily, when the resolution of the input video frame is lower than the resolution of the output video frame, the target image processing module further includes a super-resolution module, wherein the super-resolution module is configured to perform a pixel expansion on a video frame input to the super-resolution module;

wherein the scheduling unit is further configured to determine execution orders of the super-resolution module and the segmentation module based on a video format of the output video frame;

wherein when the video format of the output video frame is a three-dimensional video format, an execution order of the super-resolution module precedes that of the segmentation module; when the video format of the output video frame is a two-dimensional video format, the execution order of the super-resolution module lags behind that of the segmentation module.

Exemplarily, the segmentation module includes a first segmentation module and a second segmentation module;

wherein the first segmentation module is configured to perform image segmentation on an input video frame of a two-dimensional video format according to a splicing manner of the plurality of display devices; and the second segmentation module is configured to: extract a sub-video frame belonging to each viewpoint from an input video frame of a three-dimensional video format; divide a plurality of pixels in the sub-video frame of each viewpoint according to the splicing manner of the plurality of display devices to obtain pixels included in different region positions of each viewpoint; and splice pixels belonging to a same region position in a plurality of viewpoints.

Exemplarily, when the output video frame is in a three-dimensional video format and the input video frame is in a two-dimensional video format, the format conversion module is configured to generate a plurality of sub-video frames of the input video frame for different viewpoints based on the input video frame and a depth map corresponding to the input video frame, wherein the sub-video frame of each viewpoint includes pixels at a plurality of positions of the viewpoint.

Exemplarily, the super-resolution module includes a first super-resolution module and a second super-resolution module, wherein the first super-resolution module is configured to interpolate at least one circle of pre-set pixels at an edge of an input sub-video frame, wherein a pixel value of the pre-set pixel is a pre-set value; and the second super-resolution module is configured to perform pixel expansion on a sub-video frame output by the first super-resolution module.

Exemplarily, the system includes a plurality of playing modules, the playing module comprising the plurality of display devices, and the plurality of display devices being spliced with each other, wherein the display unit is configured to send the plurality of output video frames to at least one playing module, so that the playing module displays the plurality of output video frames on the plurality of display devices.

Exemplarily, the system includes a plurality of image processing units, wherein different image processing units correspond to playing modules spliced by different numbers of display devices, and/or correspond to playing modules spliced by display devices with different display performances; and the scheduling unit is further configured to send, according to at least one target playing module on which the input video frame is to be displayed, the input video frame to an image processing unit corresponding to the at least one target playing module, respectively.

The present disclosure provides a video playback system, including a video processing module, and a display module group connected to the video processing module, wherein the display module group is obtained by splicing a plurality of display devices, and the video processing module is configured to execute the video processing method.

A fourth aspect of the present disclosure provides a video processing device, including:

a parameter acquisition module, configured to acquire an input video frame and display parameters of the input video frame when the input video frame is displayed, wherein the display parameters include at least one of a video format and a resolution;

a processing module, configured to process the input video frame into a plurality of output video frames based on the display parameters, wherein each output video frame corresponds to a partial region of the input video frame; and a display module, configured to display the plurality of output video frames on a plurality of display devices so that the plurality of output video frames are displayed according to the display parameters.

An embodiment of the present disclosure further provides an electronic device including a memory, a processor, and computer programs stored on the memory and executable on the processor, wherein the computer programs, when executed by the processor, implement the video processing method in the first aspect of the present disclosure.

An embodiment of the present disclosure further provides a computer readable storage medium, wherein the computer readable storage medium is stored with computer programs that cause a processor to execute the video processing method in the first aspect of the present disclosure.

The above explanation is merely an overview of the technical solutions of the present disclosure. In order to know about the technical means of the present disclosure more clearly so that the solutions according to the contents of the specification may be implemented, and in order to make the above and other objects, features and advantages of the present disclosure more apparent and understandable, specific implementations of the present disclosure are set forth below.

BRIEF DESCRIPTION OF THE DRAWINGS

In order to describe technical solutions of the embodiments of the present disclosure or the related art more clearly, the accompanying drawings used in the illustration of the embodiments or the related art will be briefly introduced. Apparently, the accompanying drawings in the following explanation illustrate merely some embodiments of the present disclosure, and those skilled in the art may obtain other accompanying drawings based on these accompanying drawings without paying any creative effort. It should be noted that the scales shown in the drawings are indicative only and do not represent actual scales.

FIG. 5 is a schematic diagram illustrating a super-resolution processing in video processing in an embodiment of the present disclosure;

FIG. 6 is a schematic diagram illustrating another super-resolution processing in video processing in an embodiment of the present disclosure;

FIG. 7 is a schematic diagram illustrating performing pixel expansion on a sub-video frame in an embodiment of the present disclosure;

FIG. 8 is a schematic diagram illustrating a padding-based super-resolution processing in an embodiment of the present disclosure;

DETAILED DESCRIPTION

In order to make objects, solutions and advantages of embodiments of the present disclosure clearer, a clear and thorough description for technical solutions in the embodiments of the present disclosure will be given below in conjunction with the accompanying drawings in the embodiments of the present disclosure. Apparently, the described embodiments are a part of embodiments of the present disclosure, not all the embodiments. All other embodiments obtained, based on the embodiments in the present disclosure, by those skilled in the art without paying creative effort fall within the protection scope of the present disclosure.

In the related art, a video needs to be split and then displayed on a plurality of display devices, and different display devices play different images split out in the video; a display apparatus formed by splicing the plurality of display devices is called a splicing large screen, and the splicing large screen may include large screens such as 8K and 16K. In some practical scenarios, a general display of various types of videos needs to be implemented on the splicing large screen, and the input source video can be transformed and displayed according to the performance parameters of the splicing large screen.

In view of the above, the present disclosure provides a video processing method, the core idea of which is to process an input video frame into a plurality of output video frames according to display parameters when the input video frame is displayed on a display device, thereby displaying the plurality of output video frames on a plurality of display devices, respectively. Since the input video frame is processed according to the display parameters at the time of display, the input video frame can be processed into a video frame complying with an expected video format, or into a video frame complying with an expected resolution, or into a video frame complying with the expected video format and the expected resolution, so that the input video frames with different video formats and resolutions can be played according to the expected display parameters, thereby enabling the plurality of display devices to adapt to various types of videos, and achieving the effect of performing general playing on various types of videos.

Figure 1:
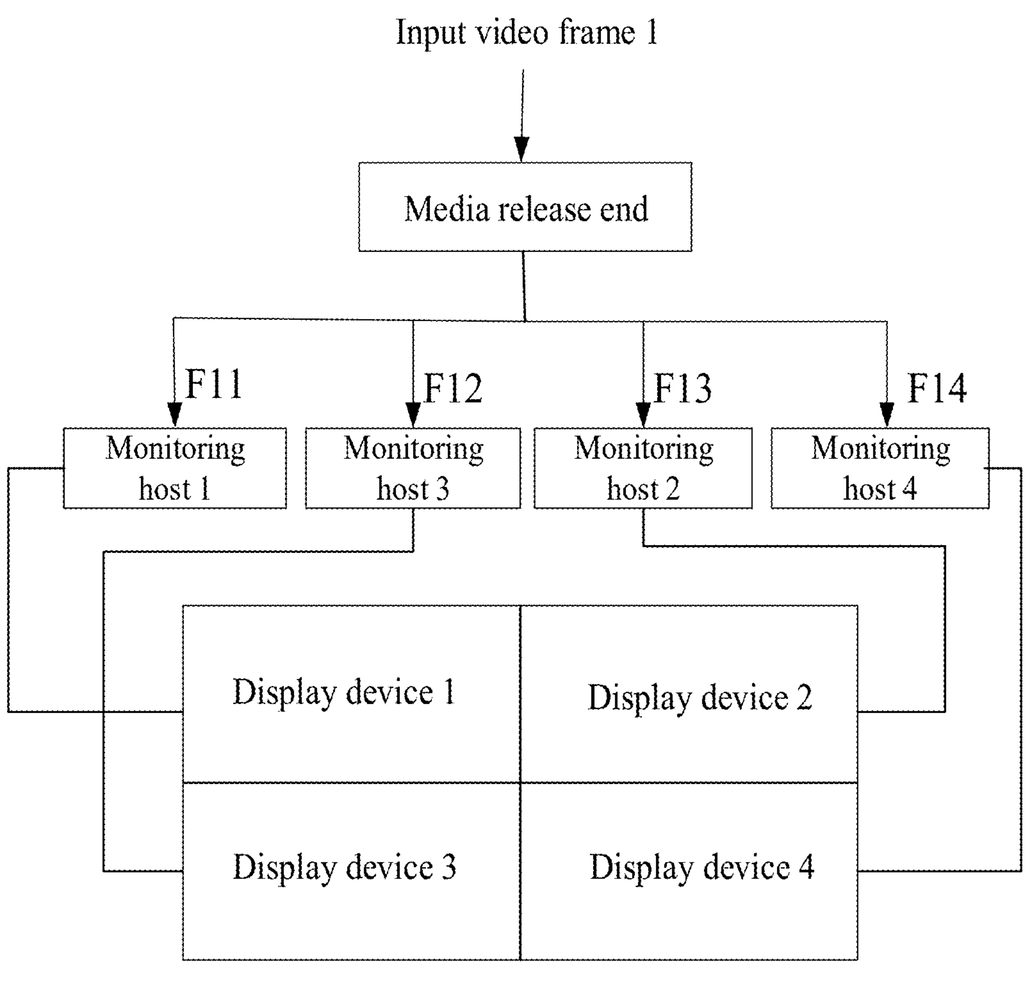
FIG. 1 is a schematic framework diagram illustrating a first implementation environment of a video processing method provided in an embodiment of the present disclosure.

Firstly, reference is made to FIG. 1, which is a schematic diagram illustrating an implementation environment of a video processing method of the present disclosure. As shown in FIG. 1, the environment includes a splicing large screen, monitoring hosts each connected to a display device in the splicing large screen, and a media release end connected to the monitoring hosts. The media release end needs to process the incoming video (input video frame 1) according to the display parameters, and then sends the processed video frames to the monitoring hosts. For example, video frame F11 to video frame F14 are obtained after the incoming video is processed, where the video frame F11 is sent to monitoring host 1, the video frame F12 is sent to monitoring host 2, the video frame F13 is sent to monitoring host 3, and the video frame F14 is sent to monitoring host 4. Then, the monitoring hosts display video frames F11 to F14 on the splicing large screen. The splicing large screen may include a display screen located in public occasions, such as a mall, a subway station, and a train station, and may also include a display screen located in a large conference room.

The splicing large screen may be an 8K screen, a 16K screen, or a 4K screen, which may realize a high definition display.

A display device of the splicing large screen can display 2D video and 3D video; the 2D video is also called two-dimensional video, and the 3D video is also called three-dimensional video. For example, the display device is an autostereoscopic 3D display device that has a cylindrical lens array and a slit grating. Since the display device has a 3D display capability, it can be used for displaying a 3D video, and a user can watch the 3D video without using an auxiliary viewing device. As another example, the display device does not include a cylindrical lens array and a slit grating, so it can be used for displaying a 2D video. As yet another example, the display device does not have 3D display capabilities, but it can still display the 3D video, in such case, the user may view the 3D display effect via an auxiliary viewing device.

Accordingly, based on the implementation environment shown in FIG. 1, the present disclosure provides a video processing system that can process an input video and then send the processed video to monitoring hosts for playing. Specifically, the video processing system is described in detail in embodiments described below and will not be repeated herein.

Figure 2:
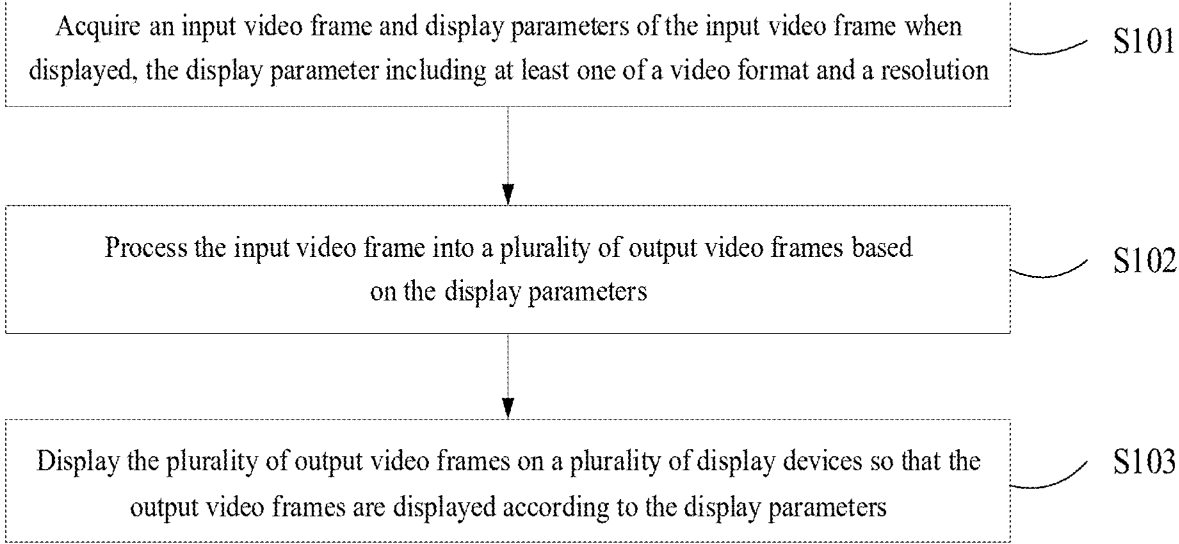
FIG. 2 is a schematic flow chart illustrating steps of a video processing method provided in an embodiment of the present disclosure.

The video processing method provided by the present disclosure is introduced in conjunction with the implementation environment shown in FIG. 1. Reference is made to FIG. 2, which is a schematic flow chart of steps of a video processing method of the present disclosure. As shown in FIG. 2, steps described below can be specifically included.

At step S101, an input video frame and display parameters of the input video frame when the input video frame is displayed are acquired, the display parameters include at least one of a video format and a resolution.

In the embodiment, the input video frame may refer to one video frame in a video stream to be played, and when the video stream arrives, each incoming video frame is called an input video frame, and then video processing needs to be performed on each incoming input video frame. The display parameters of the input video frame when it is displayed can refer to parameters of an image on the display device when the video is played. For example, if the video format is included, it refers to a video format in which the input video frame is displayed. As stated above, the video format includes a three-dimensional video format and a two-dimensional video format. In the case where the video format is the three-dimensional video format, the input video frame can be displayed as a three-dimensional video on the display device; and if the display device is an autostereoscopic 3D display device, the input video frame can achieve a stereoscopic display effect on the display device. In the case where the video format is the two-dimensional video format, the input video frame is displayed as a two-dimensional video on the display device.

The display parameters may further include a resolution, and the resolution may indicate the resolution at which the input video frame is displayed on the display device. The higher the resolution is, the input video frame will be displayed clearly on the display device.

In practice, the display parameters may include a resolution or a video format, or both of them. In the display scene of the splicing large screen, according to the display performance of the display device, the display parameters may include both a resolution and a video format to instruct the video to be played according to the display performance provided by the display device.

In the embodiment, for the same plurality of display devices, the display parameters corresponding to input video frames in different videos may be different, for example, the display parameters corresponding to a three-dimensional video and the display parameters corresponding to a two-dimensional video may be different.

Alternatively, for the same plurality of display devices, the display parameters corresponding to the input video frames in different videos may be the same, so that the input video of any video format and the input video of any resolution can be displayed on the plurality of display devices with the same display parameters, achieving the general playing of various types of videos by the splicing large screen.

Of course, the same plurality of display devices, namely, the same splicing large screen and the same video, may correspond to different display parameters at different times, for example, during the playing of the video, the display parameters of the video are manually adjusted, and then the display parameters change during the playing of the video. For another example, during the playing of the video, it is necessary to blur a sensitive image in the video. Accordingly, in a period of playing the sensitive image, it can correspond to a display parameter, and in periods except the sensitive image, it can correspond to another display parameter.

At step S102, the input video frame is processed into a plurality of output video frames based on the display parameters, and each output video frame corresponds to a partial region of the input video frame.

To make different kinds of videos can be displayed on the display device, the input video frame may be processed as the output video frame that conforms to the display parameters. Since the display parameters include the video format and/or resolution, the processing on the input video frame includes a format processing and/or a resolution processing for the input video frame.

Since the input video frame needs to be displayed on a plurality of display devices, a splicing large screen is obtained by splicing the plurality of display devices, and each display device displays an image of a partial region in the input video frame, the display parameters may also include the number and splicing manner of the display devices. The input video frame may also be segmented based on the number and splicing manner of the display devices, that is to say, the processing on the input video frame further includes a segmentation processing. It should be noted that inconsistent numbers of display devices or inconsistent splicing manners may lead to different segmentation manners of the input video.

For example, since the processing on the input video frame includes the segmentation processing, format processing, and/or resolution processing, and the segmentation processing is a necessary processing, in practice, the segmentation processing may be carried out on the input video frame first, followed by the format processing and/or resolution processing on each sub-video frame obtained through the segmentation processing; or the format processing and/or resolution processing may be carried out on the input video frame first, followed by the segmentation processing on the resulting video frame; or, in cases where the format processing and resolution processing are included, the order of the format processing, the resolution processing, and the segmentation processing can be flexibly adjusted according to practical needs, ultimately generating a plurality of output video frames.

For the format processing and the resolution processing, in the case where the video format of the input video frame does not comply with the video format in the display parameters, the video format of the input video frame needs to be converted, such as converting the video format of the input video frame from a two-dimensional video format to a three-dimensional video format, or converting the video format of the input video frame from a three-dimensional video format to a two-dimensional video format.

For example, in the case where the resolution of the input video frame does not comply with the resolution in the display parameters, the resolution of the input video frame needs to be increased, such as converting the resolution of the input video frame from a low resolution to a high resolution. As another example, if neither the resolution nor the video format of the input video frame is consistent with the resolution or the video format in the display parameters, not only the resolution of the input video frame is to be increased, but also the video format of the input video frame is to be converted.

At step S103, the plurality of output video frames are displayed on a plurality of display devices respectively, so that the output video frames are displayed according to the display parameters.

In the embodiment, since the plurality of output video frames are obtained by processing the input video frame according to the display parameters, the resolution and video format of the output video frames comply with the display performance requirements of the display devices, so that the output video frames can be displayed on the display devices according to the display parameters. For example, if the video format of the output video frame is converted into the three-dimensional video format, the output video frame is displayed on the display device with a stereoscopic effect. As another example, if the resolution of the output video frame is increased to a high resolution, the output video frame is displayed at a high resolution on the display device. As yet another example, if both the resolution and video format of the output video frame are processed, the output video frame may be subjected to three-dimensional stereoscopic display at high resolution on the display device.

In the technical solution of the embodiment, the input video frame is processed into a plurality of output video frames according to the display parameters, so that the input video frame can be split and displayed on a plurality of display devices, thereby realizing the split display of the video. Since the display parameters include at least one of the video format and the resolution, when the video is split for display, the input video frame can be processed into a video frame complying with the expected video format, or into a video frame complying with the expected resolution, or into a video frame complying with both the expected video format and the expected resolution, so that the input video frames with different video formats and resolutions can be played according to the expected display parameters. In this way, the plurality of display devices are enabled to adapt to various types of videos, achieving the effect of performing general playing on various types of videos.

In an alternative embodiment, during processing the input video frame into a plurality of output video frames based on the display parameters, a general display of various types of input video frames may be achieved. In this case, a corresponding video processing logic may be set for the input video frame based on the display parameters and the input parameters of the input video frame. The display parameter may reflect the video format and resolution of the output video frame, and the input parameters may reflect the video format and resolution of the input video frame. Based on the input parameters and the display parameters, a difference between an input video frame and a desired output video frame can be determined, and a corresponding video processing logic is set for the input video frame according to the difference.

In this alternative embodiment, the video processing logic for an incoming input video frame may be determined based on the input parameters of the input video frame and the display parameters of the input video frame when it is displayed; the video processing logic may include at least one image processing; when the input video frame is processed according to the video processing logic, the at least one image processing may be performed in an execution order. It should be noted that since it is necessary to segment the input video frame into a plurality of output video frames for output, the at least one image processing includes the segmentation processing, and the segmentation processing is used for segmenting the video frame according to the number and splicing manner of the display devices.

In a specific implementation, input parameters of the input video frame may be acquired, and at least one image processing may be performed sequentially on the input video frame based on the input parameters and the display parameters. The input parameters include at least one of a video format and a resolution, and the segmentation processing is used for segmenting the current video frame into a plurality of sub-video frames; a plurality of sub-video frames correspond to a plurality of output video frames, respectively; and the current video frame is the input video frame or a video frame obtained by processing the input video frame through an image processing except for the segmentation processing.

In the embodiment, for two input video frames with the same input parameters, if the display parameters corresponding to each input video frame are different, the video processing logic of the two input video frames may also differ; likewise, for two input video frames corresponding to the same display parameter, if the input parameters of the two input video frames are different, the video processing logic of the two input video frames will also be different.

It is possible to determine the image processing to be performed on an input video frame based on the input parameters and display parameters. For example, if it is determined that only the segmentation processing is required for the input video frame based on the input parameters and display parameters (which means consistency between the input parameters and display parameters), the image processing will only include the segmentation processing. As another example, when it is determined based on the input parameters and display parameters that a format conversion is needed for the input video frame, the image processing will include the segmentation processing and the format conversion processing. As another example, if it is determined that the resolution of the input video frame needs to be increased based on the input parameters and the display parameters, the image processing will include the segmentation processing and the resolution processing (that is, the super-resolution processing in subsequent embodiments). As another example, if it is determined based on the input parameters and the display parameters that it is required to increase the resolution of the input video frame and perform a format conversion, the image processing will include the segmentation processing, the format conversion processing, and the super-resolution processing.

In the case where only the segmentation processing is included, merely the segmentation processing is performed on the input video frame based on the number and splicing manner of the display devices to obtain a plurality of output video frames. In this case, the current video frame subjected to the segmentation processing is the input video frame, and the plurality of sub-video frames output through the segmentation processing are considered as the plurality of output video frames.

In the case where the image processing includes the segmentation processing as well as at least one of the super-resolution processing or the format conversion processing, the execution order among the various image processing can be determined first. Next, the input video frame is subjected to the image processing in the execution order. In this case, when the segmentation processing is executed, the current video frame being processed is either the input video frame or a video frame output through other image processing (an image processing other than the segmentation processing). In other words, the execution order of the segmentation processing may be the first, the last, or between the first and the last.

With the above-mentioned scheme, the execution order of various image processing performed on the input video frame may be different depending on different input parameters and display parameters, so that a more adaptive video processing on the input video frame can be achieved, for example, the quality of the video processing can be ensured while ensuring the efficiency of the video processing.

Hereinafter, an explanation is made on how to perform image processing on the input video frame based on the input parameters and the display parameters.

In example #1, the display parameters only include the video format, which means that the input video frame needs to be displayed according to a pre-set video format and it is not necessary to process the resolution of the input video frame. The processing method of the example #1 is as follows.

When a video is processed, the input video frame may be processed according to the video format of the input video frame and the video format of the output video frame, and the image processing includes a format conversion processing and a segmentation processing. For example, in the case where the video format of the input video frame and the video format of the output video frame are different, the video format of the input video frame may be subjected to a format conversion processing, such as converting the input video frame from a 3D video format to a 2D video format for output or converting the input video frame from a 2D video format to a 3D video format for output. In this case, the input video frame may be subjected to the format conversion processing first, and then the format-converted video frame may be subjected to the segmentation processing.

In a specific implementation, when the video format of the output video frame is different from the video format of the input video frame, the format conversion processing is performed on the input video frame; the format conversion processing is used for converting the input video frame into a first video frame complying with the video format in the display parameters, and then the segmentation processing may be performed on the first video frame to obtain a plurality of output video frames.

In example #1, if the video format of the output video frame is different from the video format of the input video frame, the video format of the input video frame needs to be converted into a preset video format, as stated above, the conversion of the video format includes converting from the 2D video format to the 3D video format and converting from the 3D video format to the 2D video format. The format conversion processing of converting the 2D video format into the 3D video format can be performed in combination with a depth map of the input video frame. The depth map can provide depth values of the pixel points in the input video frame, and distinguish a foreground and a background, so that the input video frame in the two-dimensional video format is converted into a first video frame in the three-dimensional video format.

In the format conversion processing of converting the 3D video format into the 2D video format, the input video frame generally includes a plurality of viewpoints, that is, including images at different viewing angles, and in practice, an image from one of the viewpoints can be extracted from the input video frame to convert the input video frame in the three-dimensional video format into a first video frame in the two-dimensional video format.

In example #1, the execution order of the format conversion processing may be set to precede the execution order of the segmentation processing, so that the video frame targeted by the segmentation processing is the first video frame obtained through the format conversion, and thus the first video frame may be segmented according to the number and splicing manner of the display devices to obtain a plurality of output video frames.

With example #1, since the segmentation processing is performed after the format conversion processing, the format conversion processing can be performed on the whole input video frame; the conversion efficiency can be improved as compared to the case where the format conversion processing is performed after the segmentation processing, in which the format conversion is required to be performed on a plurality of sub-video frames obtained through the segmentation processing. In addition, in the case where it is necessary to convert an input video frame from the 2D video format to the 3D video format, the input video frame is first converted into the 3D video format, so as to avoid the loss of image information due to segmentation first and improve the quality of an output video frame.

Figure 3:
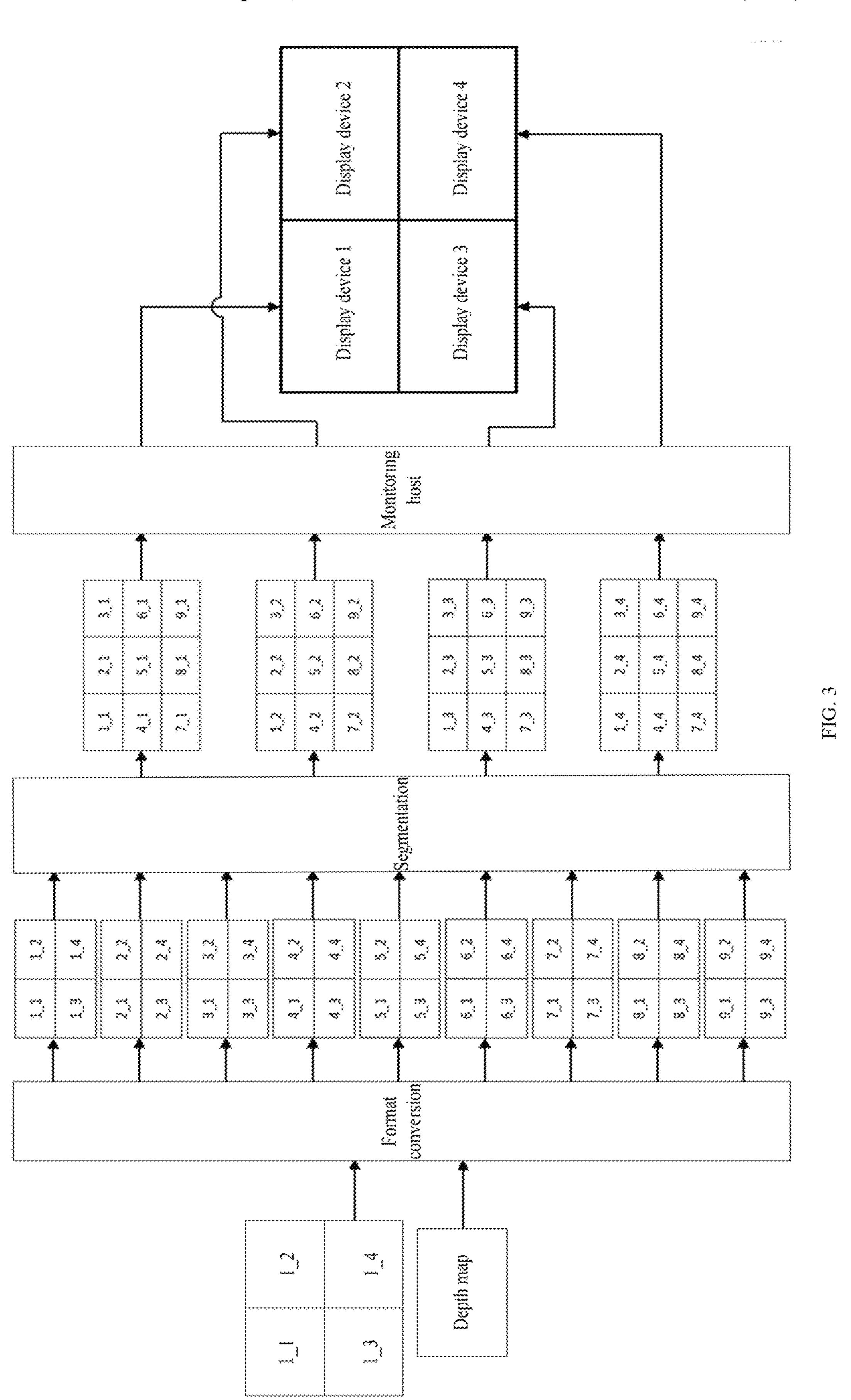
FIG. 3 is a schematic diagram illustrating a video processing flow in an embodiment of the present disclosure when an input video frame in a 2D video format is converted to an output in a 3D video format.

For example, reference is made to FIG. 3, which is a schematic diagram illustrating a video processing flow of converting an input video frame from the 2D video format to the 3D video format for output. As shown in FIG. 3, the input video frame is in a two-dimensional video format, and the video format of the output video frame is a three-dimensional video format; when performing the format conversion processing on the input video frame, a depth map corresponding to the input video frame may be acquired; and a plurality of sub-video frames of the input video frame are generated based on depth values corresponding to various pixels in the depth map and pixel values corresponding to various pixels in the input video frame, the plurality of sub-video frames include a plurality of viewpoints and pixels of each viewpoint at a plurality of positions.

As stated above, the depth map may include a depth value of each pixel in the input video frame, and the depth value may characterize whether the pixel belongs to the foreground or the background. In practice, a plurality of viewpoints included and pixels of each viewpoint at a plurality of positions may be restored based on pixel values of various pixels in the input video frame and depth values of pixels at corresponding positions in the depth map. The viewpoint can be understood as a viewing angle, different viewpoints correspond to different viewing angles, an image can be formed under different viewing angles, and images for a plurality of viewpoints can form a three-dimensional video frame for stereoscopic display. The image for each viewpoint may be referred to as a sub-video frame. As shown in FIG. 3, according to the input video frame and the depth map, nine viewpoints are restored, and nine sub-video frames are obtained; each sub-video frame includes pixels at a plurality of different positions; for different sub-video frames, pixel values of pixels at the same position may be the same or different. In this way, the sub-video frames corresponding to respective viewpoints constitute video data of a first video frame, and a stereoscopic display effect can be achieved based on the video data.

Next, a segmentation processing may be performed on the first video frame, and a plurality of output video frames are obtained through the segmentation processing. In this case, each output video frame among the plurality of output video frames may include a plurality of viewpoints, and the plurality of viewpoints correspond to pixels of the same position region; for example, each output video frame includes nine viewpoints, and the nine viewpoints correspond to pixels of the same position region, so that a stereoscopic display effect can be achieved for the output video frame displayed on each display device when a plurality of output video frames are spliced and displayed on a plurality of display devices.

Figure 4:
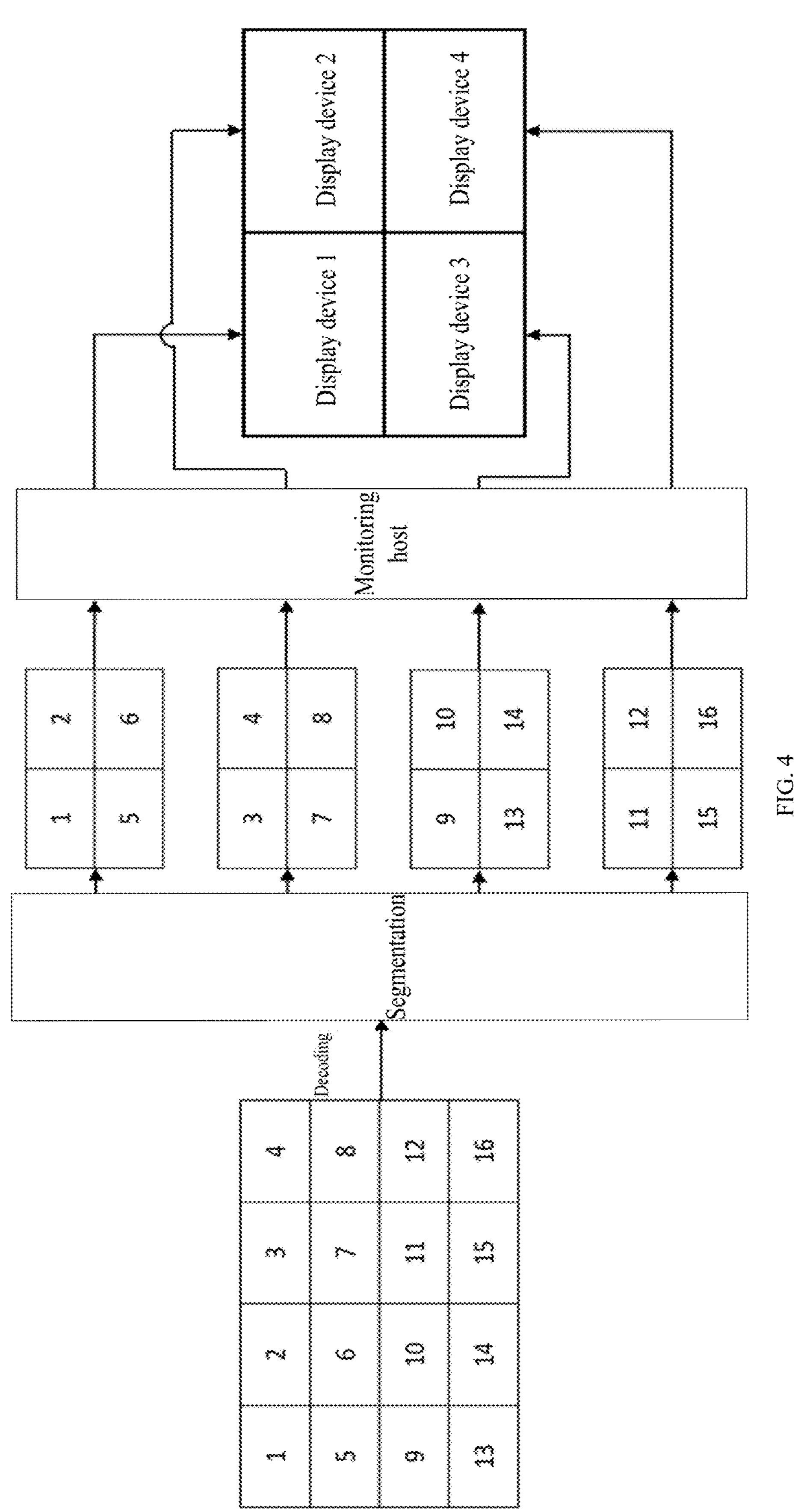
FIG. 4 is a schematic diagram illustrating segmenting a first video frame in a two-dimensional (2D) video format in an embodiment of the present disclosure.

In example #1, the segmentation processing for a first video frame in different video formats is described as follows, When a first video frame in a two-dimensional video format is segmented, the first video frame is obtained by converting an input video frame from a 3D video format to a 2D video format, then the process of segmentation may refer to FIG. 4; FIG. 4 is a schematic diagram illustrating segmenting a first video frame in a two-dimensional video format. As shown in FIG. 4, the first video frame may be divided according to the splicing manner and number of a plurality of display devices. For example, as shown in FIG. 1, the splicing large screen is obtained by splicing four display devices, the first video frame may be divided into four regions according to the splicing manner of the four display devices, and the four regions correspond to the four display devices, respectively. For example, an image of region 1 (pixels 1, 2, 5, and 6) is displayed on display device 1, an image of region 2 (pixels 3, 4, 7, and 8) is displayed on display device 2, an image of region 3 (pixels 9, 10, 13, and 14) is displayed on display device 3, and an image of region 4 (pixels 11, 12, 15, and 16) is displayed on display device 4.

When a first video frame in a three-dimensional video format is segmented, the first video frame is obtained by converting an input video frame from a 2D video format to a 3D video format, then the process of segmentation may refer to FIG. 3. As shown in FIG. 3, the converted first video frame includes sub-video frames corresponding to a plurality of viewpoints, and each sub-video frame includes pixels at a plurality of positions under the viewpoint. Thus, when the first video frame is segmented, pixels in the sub-video frames of the plurality of viewpoints may be subjected to a pixel rearrangement, and the pixel rearrangement may be used for integrating pixels at different region positions under the plurality of viewpoints, so that the pixels under a plurality of viewpoints of the same region position are arranged together to constitute a three-dimensional video of the region position.

In a specific implementation, a plurality of pixels included for each viewpoint may be divided according to the splicing manner and number of the display devices, to obtain, for each viewpoint, the pixels included in different region positions; then, pixels belonging to the same region position under a plurality of viewpoints can be spliced to obtain output video frames corresponding to a plurality of region positions.

For a sub-video frame under each viewpoint, in pixel 1_1, the first 1 represents the viewpoint, and the second 1 represents the first pixel of the first sub-video frame; in the pixel 1_2, the first 1 represents the viewpoint, and the second 2 represents the second pixel of the first sub-video frame; in practice, the sub-video frame under the viewpoint can be divided according to the splicing manner and the number of the display devices; as shown in FIG. 3, the sub-video frame under each viewpoint includes four pixels of different regions, and the number of the display devices is four, and the splicing manner is shown in FIG. 1, then the division of the sub-video frames can be shown in FIG. 3, namely, the pixel 1_1, the pixel 1_2, the pixel 1_3, and the pixel 1_4 belong to different region positions.

Then, the pixels of the divided sub-video frames are rearranged, and the rearrangement is performed according to the divided region position; for example, for region position 1, the pixels belonging to the region position 1 under the viewpoints need to be combined; as shown in FIG. 3, for region position 1, the first pixels belonging to the region position 1 under nine viewpoints are arranged together to obtain a three-dimensional sub-video frame of region position 1; the region position 1 includes pixels under different viewpoints to obtain images of the region position 1 under different viewing angles, and when these images are displayed in a display device, they are possible to superimpose each other to constitute a stereoscopic display effect. For example, as shown in FIG. 3, when the pixels are rearranged, using a pixel (_1) at the first position in 9 viewpoints to form an image matrix, using a pixel (_2) at the second position in 9 viewpoints to form an image matrix, and so on, new image matrices are formed for positions_3 and _4, respectively; and finally four images with pixels being rearranged are obtained, then the synchronization of four image streams is controlled via a control module before displaying and playing on display device 1, display device 2, display device 3, and display device 4.

In example #2, the display parameters only include the resolution, which means that the input video frame only needs to be displayed according to a pre-set resolution, and it is not necessary to process on the video format of the input video frame. The processing method of the example #2 is as follows.

If the resolution of the output video frame is higher than the resolution of the input video frame, a super-resolution processing needs to be performed on the input video frame. The super-resolution processing is used for increasing the resolution of the input video frame so that the resolution of the output video frame is the resolution determined in the display parameters.

Specifically, the super-resolution processing may be performed before the image segmentation or after the image segmentation. For example, the super-resolution processing may be performed before the image segmentation regardless of the video format of the input video frame or regardless of the video format of the output video frame. For example, if the output video frame and the input video frame are both video frames in a two-dimensional video format, the input video frame may be subjected to a super-resolution processing first, and then the segmentation processing is performed on the video frame subjected to the super-resolution processing. The segmentation processing on the second video frame in the two-dimensional video format may refer to the above-mentioned process of segmenting the first video frame in the two-dimensional video format, which will not be described in detail herein. For another example, if the output video frame and the input video frame are both video frames in a three-dimensional video format, the input video frame may be subjected to a super-resolution processing first, and then a segmentation processing is performed on the video frame subjected to the super-resolution processing; the process of segmentation processing may refer to the above-mentioned process of segmenting the first video frame in the three-dimensional video format, which will not be described in detail herein.

As another example, the super-resolution processing may be performed after the image segmentation regardless of the video format of the input video frame or the video format of the output video frame. For example, if the output video frame and the input video frame are both video frames in a two-dimensional video format, the input video frame may be subjected to a segmentation processing first, and then a super-resolution processing may be performed on a plurality of sub-video frames obtained through the segmentation processing. As another example, both the output video frame and the input video frame are video frames in a three-dimensional video format, and the input video frame may be subjected to a segmentation processing first, and then a super-resolution processing is performed on a plurality of sub-video frames obtained through the segmentation processing.

As another example, in performing the super-resolution processing on the input video frame, the execution order of the super-resolution processing and the segmentation processing may be determined based on the video format of the output video frame, whereby the execution order of the super-resolution processing and the segmentation processing may be changed depending on different video formats of the output video frame, so as to improve the effect of the video processing. Accordingly, when the super-resolution processing is to be performed, the super-resolution processing may be performed on the input second video frame according to the resolution of the output video frame; the second video frame is the input video frame or a sub-video frame.

Specifically, if the super-resolution processing is performed before the segmentation processing, the super-resolution processing may be aimed at the input video frame, that is to say, the super-resolution processing is performed on the input video frame first to obtain a video frame subjected to the super-resolution processing, followed by a segmentation processing on the video frame subjected to the super-resolution processing; and if the super-resolution processing is performed after the segmentation processing, the segmentation processing is performed on the input video frame first to obtain a plurality of sub-video frames, and then the super-resolution processing is performed on each sub-video frame.

For example, if the video formats of the output video frames are all the two-dimensional video format, it is determined that the execution order of the segmentation processing precedes the execution order of the super-resolution processing; if the video format of the output video frame is the three-dimensional video format, it is determined that the execution order of the segmentation processing lags behind that of the super-resolution processing.

In the case where the video format of the output video frame is the three-dimensional video format, the output video frame includes a plurality of viewpoints, and each viewpoint includes pixels at a plurality of different positions, a super-resolution processing may be performed first, so that a pixel expansion is performed on each viewpoint first. Since one viewpoint corresponds to a sub-video frame for the viewpoint, in this case, the resolution of the sub-video frame for each viewpoint may be enhanced first, then the sub-video frames of the plurality of viewpoints are segmented, for example the above-described pixel rearrangement, so as to avoid the case where there is disparity inconsistency when the resolution is increased after the segmentation, which will affect the stereoscopic display effect.

Figures 5, 6:
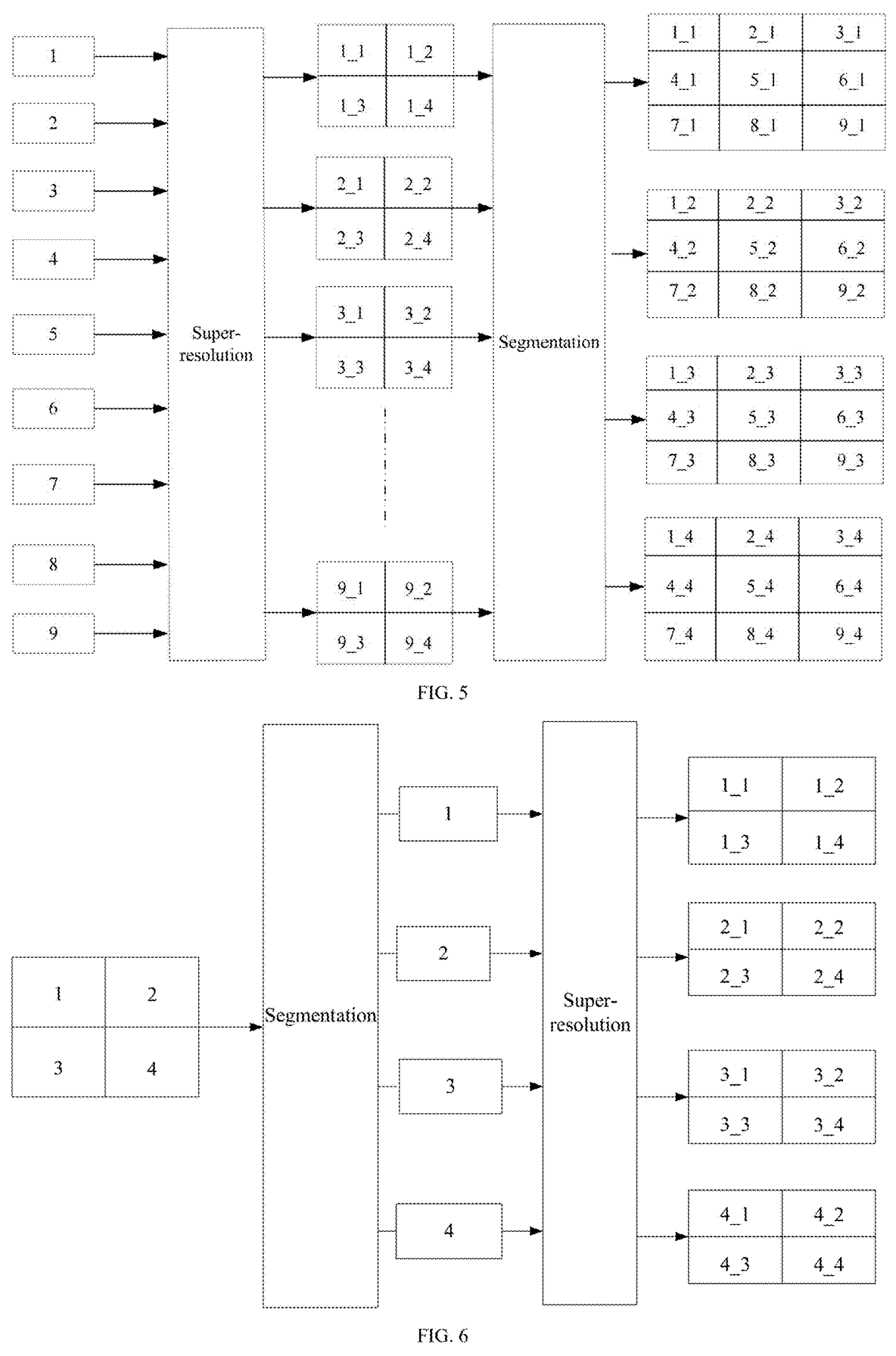

Reference is made to FIG. 5, which is a schematic diagram illustrating a super-resolution processing in video processing. As shown in FIG. 5, the video format of an output video frame is a three-dimensional video format, and in this case, no matter whether the input video is a two-dimensional video format or a three-dimensional video format, the second video frame for which the super-resolution processing is performed is a video frame in the three-dimensional video format. Specifically, the super-resolution processing may be performed for each viewpoint in the second video frame, namely, the super-resolution processing is performed for a sub-video frame of each viewpoint in the second video frame.

In a specific implementation, sub-video frames belonging to various viewpoints may be extracted from the second video frame, and the sub-video frame includes pixels at a plurality of positions; then, a pixel expansion is performed on the pixels in the sub-video frame of each viewpoint; the segmentation processing is used for rearranging, according to the splicing manner of a plurality of display devices, pixels in the sub-video frames of a plurality of viewpoints subjected to the pixel expansion to obtain an output video frame.

The second video frame may be an input video frame. Since the input video frame is in a three-dimensional video format, it includes sub-video frames corresponding to the viewpoints. The sub-video frame of each viewpoint includes a plurality of pixels at different positions. When a pixel expansion is performed on the pixels in the sub-video frame of the viewpoint, nonlinear interpolation may be used to increase the number of pixels in the sub-video frame, thereby improving the resolution of the sub-video frame of each viewpoint. Note that when the pixel expansion is performed on sub-video frames of a plurality of viewpoints, the pixel expansion scales of different sub-video frames are the same.

Then, in performing the pixel expansion on the pixels of the sub-video frame of each viewpoint, the pixels in a plurality of sub-video frames subjected to the pixel expansion may be rearranged in the above-mentioned manner of performing segmentation processing on the first video frame in the three-dimensional video format, thereby obtaining a plurality of output video frames.

Reference is made to FIG. 6, which is a schematic diagram illustrating another super-resolution processing in video processing. As shown in FIG. 6, in example #2, the video format of the output video frame is a two-dimensional video format, and in this case, no matter whether the input video is a two-dimensional video format or a three-dimensional video format, the second video frame targeted by the super-resolution processing thereof is a plurality of sub-video frames obtained through the segmentation processing. Specifically, if the input video frame is in a two-dimensional video format, the second video frame may be a sub-video frame obtained by performing the segmentation processing on the input video frame; if the input video frame is a three-dimensional video format, the input video frame may be converted into a video frame in a two-dimensional video format, and then the converted video frame in the two-dimensional video format is segmented to obtain a sub-video frame for super-resolution processing.

The sub-video frame is a video frame with two-dimensional data. In a specific implementation, for each sub-video frame in a plurality of sub-video frames, pixel expansion may be performed on pixels included in the sub-video frame to obtain an output video frame corresponding to each sub-video frame.

As shown in FIG. 5 and FIG. 6, pixel expansion is involved in the super-resolution processing, and the pixel expansion can increase the number of pixels in the sub-video, and in the case where the number of pixels increases, the resolution can be improved. For example, for either a video frame in a three-dimensional video format or a video frame in a two-dimensional video format, the super-resolution processing is for a sub-video frame in an input video frame. Specifically, in the two-dimensional video format, the object of the super-resolution processing is a sub-video frame obtained through segmenting the two-dimensional video frame, and in the three-dimensional video format, the object of the super-resolution processing is a sub-video frame of each viewpoint in the three-dimensional video frame.

Then, no matter whether the object of the super-resolution processing is the sub-video frame obtained through segmenting the two-dimensional video frame or the sub-video frame of each viewpoint in the three-dimensional video frame, the above-mentioned two sub-video frames may be regarded as an image to be processed, and a super-resolution processing is performed on the image to be processed.

For example, the pixel expansion may be a linear interpolation on a sub-video frame, specifically including at least one of a nonlinear interpolation, a bilinear interpolation, and a trilinear interpolation.

As another example, the pixel expansion may be performed using a neural network model, for example, inputting the sub-video frames into a repair model to increase the resolution of the sub-video frames through the repair model. Training samples of the repair model may include a plurality of image sample pairs, each image sample pair including a high-resolution image and a low-resolution image for the same image. During a training process, the low-resolution image is input to the repair model, a loss function is constructed according to a predicted image and a high-resolution image output by the repair model; a loss value is calculated according to the loss function, and parameters of the repair model are continuously updated according to the loss value, to train a repair model that can be used to perform a super-resolution processing on the image.

As another example, in the pixel expansion process, a padding processing may be performed on each sub-video frame to be subjected to the super-resolution processing. The padding processing may refer to expanding n pixels at the edges of the sub-video frame, for example, n pixels may be supplemented at four edges including top, bottom, left, and right of the sub-video frame, then a pixel expansion is performed on the sub-video frame subjected to the padding processing. As a result, jagged edges can be avoided at the edges of the sub-video frame during pixel expansion, improving the quality of the super-resolution image. In a specific implementation, for each sub-video frame, at least one circle of first pixels is interpolated outside the first edge of the sub-video frame to obtain an intermediate sub-video frame; the pixel expansion is performed on pixels included in each intermediate sub-video frame, and the pixel value of the first pixel is a pre-set value.

Reference is made to FIG. 7, which is a schematic diagram illustrating performing pixel expansion on a sub-video frame. As shown in FIG. 7, for either a sub-video in a two-dimensional video format or a sub-video of each viewpoint, at least one circle of first pixels can be expanded outside a first edge of the sub-video frame. Specifically, the first edge may refer to an edge of each side of the sub-video frame, as shown in FIG. 7, it may refer to edges of four sides including top, bottom, left, and right of the sub-video frame. At least one circle of first pixels with a pixel value being a pre-set value may be supplemented at the edges of the four sides including top, bottom, left, and right of the sub-video frame. For example, n first pixels are supplemented outside pixels at each edge of the sub-video frame to be adjacent to pixels at the edge; when n is 1, one first pixel is supplemented at the edge, then the size of the sub-video frame extends outward by one pixel; and when n is greater than 1, n first pixels are supplemented at the edge, then the size of the sub-video frame extends outward by n pixels.

The pre-set value may be 0, that is, a circle of pixels with a pixel value of 0 can be interpolated outside the first edge of the sub-video frame. In the subsequent pixel expansion, since the pixel value of the pixel points at the edge of the sub-video frame is 0, the jagged edge phenomenon can be improved, and the image quality at the edge is improved.

In some embodiments, if the video format of the input video frame is a two-dimensional video format and the video format of the output video frame is also a two-dimensional video format, a padding operation may also be performed before the pixel expansion. Specifically, the padding may be performed on an original input video frame before the segmentation processing; after the padding, the surrounding edges of the input video frame are subjected to padding first, and then the padded input video frame is segmented. In this way, for the segmented sub-video frame, the padding can only be performed on the remaining edges, thereby enabling the padding operation to be completed in stages, improving the processing efficiency.

In a specific implementation, at least one circle of second pixels can be interpolated outside a second edge of the input video frame to obtain a third video frame, and the third video frame is subjected to the segmentation processing to obtain a plurality of sub-video frames. The pixel value of the second pixel is a pre-set value, and the first edge is an edge in the sub-video frame except for the second edge.

Reference is made to FIG. 8, which is a schematic diagram illustrating a padding-based super-resolution processing. As shown in FIG. 8, at least one circle of second pixels is interpolated at the second edge of the input video frame first; specifically, the second edge may be four edges (i.e. top, bottom, left, and right) of the input video frame; one circle or a plurality of circles of the second pixels may interpolated, and the pixel value of the second pixel may be 0; the padding process may refer to the process shown in FIG. 7. After performing the padding on the input video frame, the size of the input video frame expands outward by n pixels. For example, the input video frame includes 1024 pixels in the length direction, after one circle of padding is performed, two pixels are extended in the length direction and two pixels are extended in the height direction.

After performing padding on the input video frame, the segmentation processing may be performed on the input video frame subjected to the padding, and the segmentation processing is performed according to the number and splicing manner of the display devices. A plurality of sub-video frames obtained through the segmentation processing may be shown in FIG. 8. In this way, for each sub-video frame, part of the edges of some or all of the sub-video frames already have padded second pixels according to the segmentation manner; to make the sizes of sub-video frames consistent with each other, for each sub-video frame, a padding operation may be performed on the first edge of the sub-video frame except the second edge.

For example, as shown in FIG. 8, one circle of second pixels is supplemented outside the edge of the input video frame, and then the input video frame subjected to the padding processing is segmented in a grid manner, so that two adjacent second edges of each sub-video frame obtained are supplemented with second pixels; and if two other adjacent first edges are not supplemented with second pixels, one circle of first pixels may be supplemented on the other adjacent first edges.

FIG. 8 shows an example of dividing an input video frame in a grid manner; in other examples, the input video frame is divided in a manner of nine-grid pattern or other manners; if the input video frame is divided in a nine-grid manner, there are four edges of a sub-video frame that are not supplemented with the second pixel, and the sub-video frame can be supplemented with the first pixel at all peripheral edges thereof so that the size of a plurality of sub-video frames after the edges are supplemented can be the same.

The scale of the padding performed on the sub-video frame is consistent with the scale of the padding performed on the input video frame, for example, if n second pixels are supplemented on the peripheral edge of the input video frame, then n first pixels are also supplemented outside the first edge of the sub-video frame. The pixel values of the first pixel and the second pixel are both pre-set values, for example, both being 0.

With the implementation, since an input video frame may be subjected to an initial padding, the padded input video frame is segmented, and then a padding is performed on a plurality of sub-video frames obtained through the segmentation again. By performing padding twice, the peripheral edge of each sub-video frame is extended by n pixels, so that the image quality of the video frame at the edge can be improved.

In example #3, the display parameters include a resolution and a video format, which represents that an input video frame needs to be displayed according to a pre-set resolution and a pre-set video format, that is, both the video format and the resolution of the input video frame need to be processed, and the processing method of the example #3 is as follows.

According to the video format of the input video frame and the video format of the output video frame, it is determined whether a format conversion needs to be performed on the input video frame; and according to the resolution of the input video frame and the resolution of the output video frame, it is determined whether a super-resolution processing needs to be performed on the resolution of the input video frame. The video processing logic of the input video frame may be set according to whether it is necessary to perform a format conversion on the input video frame and whether it is necessary to perform a super-resolution processing on the resolution of the input video frame. Based on the above embodiments, there are several video processing logics as follows.

According to a first video processing logic, it is not necessary to perform a format conversion on the input video frame, and a super-resolution processing needs to be performed on the resolution of the input video frame.

Figure 9:
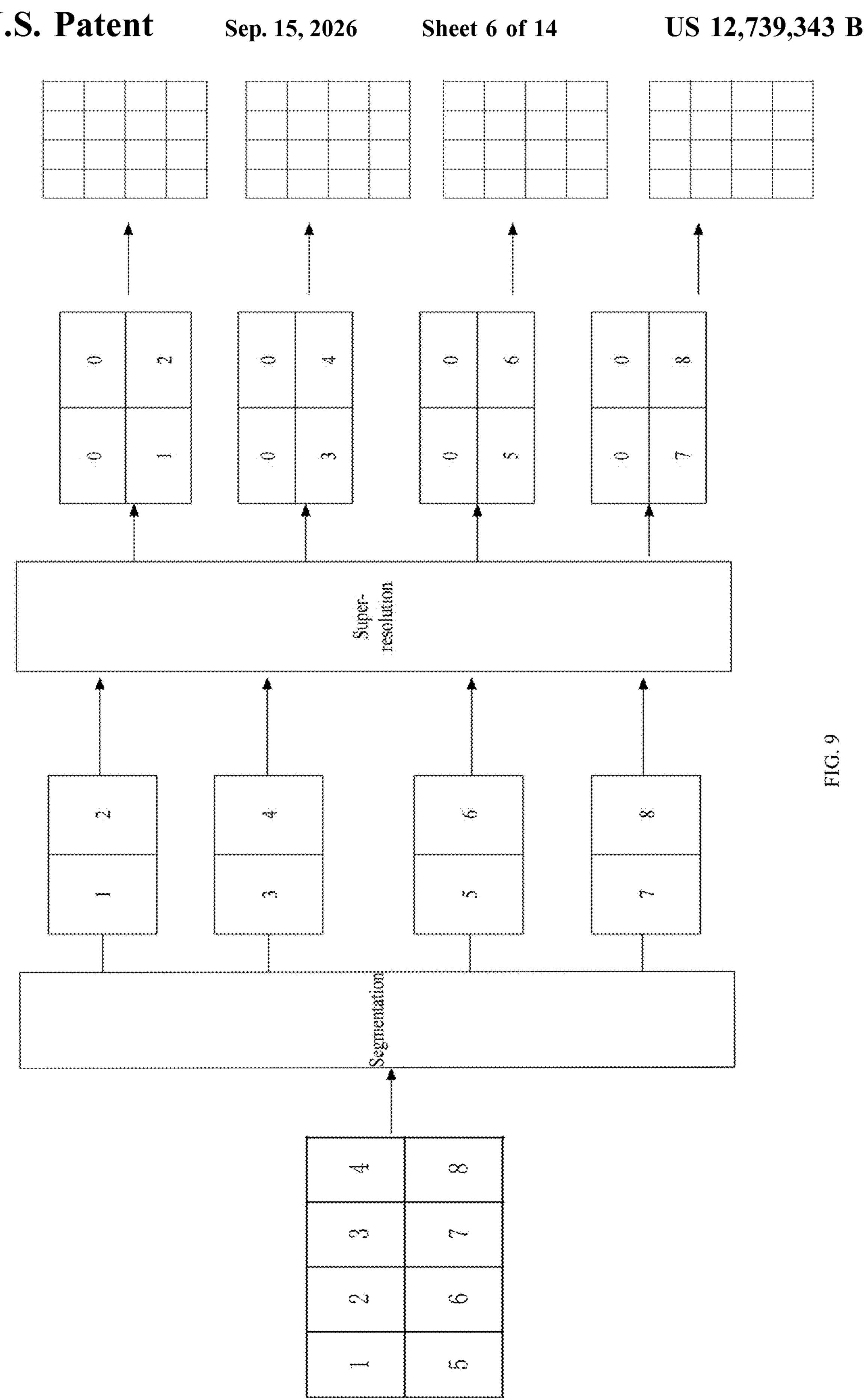
FIG. 9 is a schematic diagram illustrating performing super-resolution and segmentation on a two-dimensional video in an embodiment of the present disclosure.

The video format of the input video frame is a two-dimensional video format, and the video format of the output video frame is also a two-dimensional video format, then the video processing logic may be performing a segmentation processing first and then performing a super-resolution processing. Referring to FIG. 9, FIG. 9 is a schematic diagram illustrating a process of performing super-resolution and segmentation on a two-dimensional video. As shown in FIG. 9, the input video frame may be segmented in a four-grid manner to obtain four sub-video frames; then, padding processing is performed on each sub-video frame first, for example supplementing a circle of pixels with a pixel value of 0 at four edges of the sub-video frame; then, each of the padded sub-video frames is fed into a repair model to obtain an output video frame with a high resolution.

Figure 10:
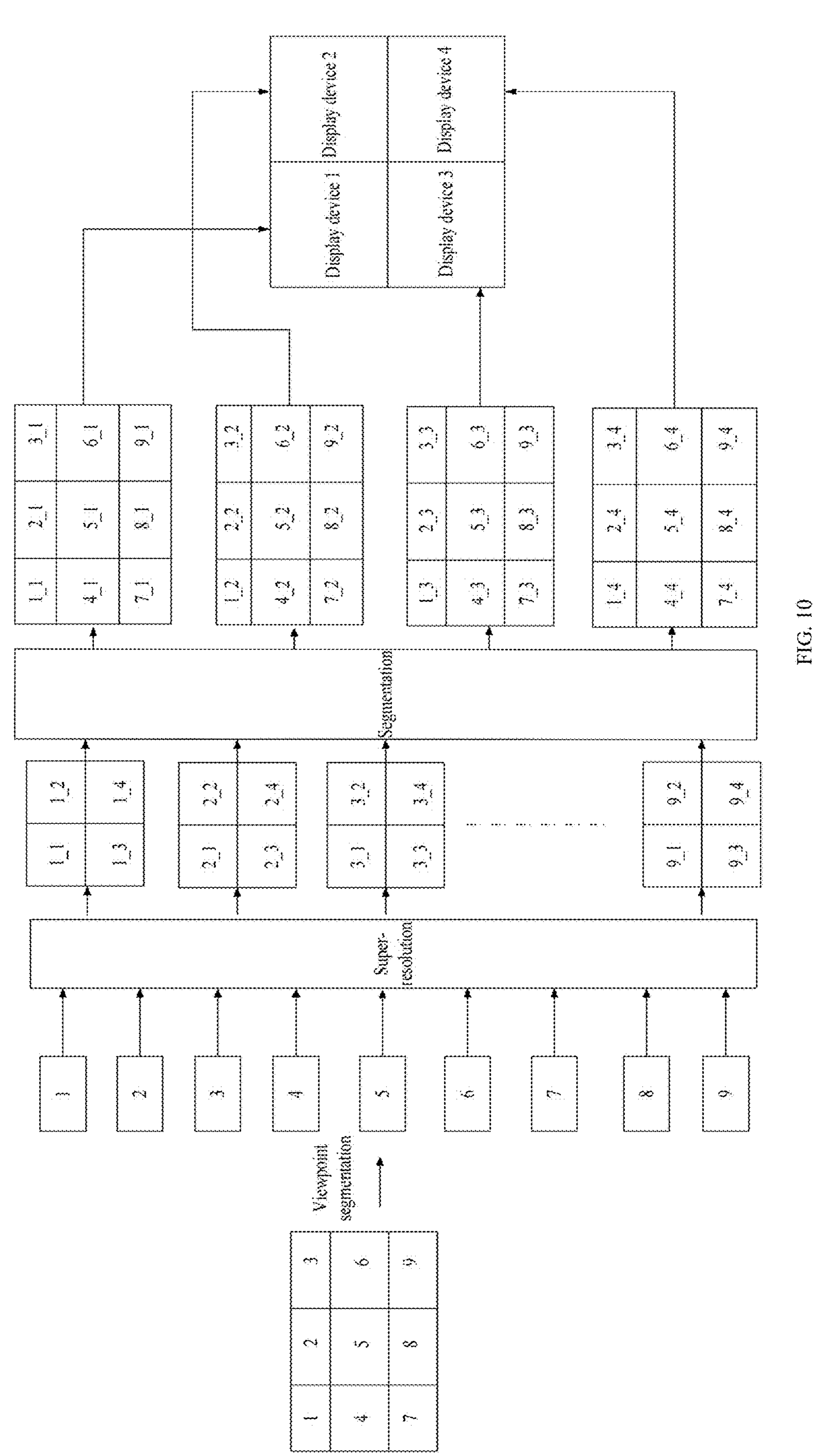
FIG. 10 is a schematic diagram illustrating performing video processing on a three-dimensional video in an embodiment of the present disclosure.

The video format of the input video frame is a three-dimensional video format, and the video format of the output video frame is also a three-dimensional video format, then the video processing logic may be performing viewpoint segmentation processing first, then performing super-resolution processing, and then performing segmentation processing. Reference is made to FIG. 10, which is a schematic diagram illustrating performing video processing on a three-dimensional video. As shown in FIG. 10, a sub-video frame of each viewpoint is extracted from the input video frame first, and then a circle of pixels with a pixel value of 0 are expanded at the edge of the sub-video frame of each viewpoint; next, the sub-video frame subjected to padding processing is sent to a repair model to obtain a sub-video frame with a high resolution; next, a pixel rearrangement is performed on the sub-video frames of a plurality of viewpoints output by the repair model, for example segmenting the sub-video frame of each viewpoint according to the number and splicing manner of the display devices to obtain pixels of different region positions, and then the pixels belonging to the same region position in a plurality of viewpoints are combined to obtain an output video frame of a region position.

According to a second video processing logic, it is necessary to perform a format conversion on the input video frame, and it is not necessary to perform a super-resolution processing on the resolution of the input video frame.

The video format of the input video frame is a two-dimensional video format, the video format of the output video frame is a three-dimensional video format, and the resolution of the input video frame is the same as the resolution of the output video frame. In this case, the video processing logic may be performing a format conversion processing and then performing a segmentation processing. Referring to FIG. 3, according to an input video frame and a depth map corresponding to the input video frame, a plurality of viewpoints and a sub-video frame of each viewpoint are restored to convert an input video frame in a two-dimensional video format into a video frame in a three-dimensional video format; then the sub-video frame of each viewpoint is segmented according to the number and splicing manner of the display devices to obtain pixels at different region positions; and then pixels belonging to the same region position in a plurality of viewpoints are combined to obtain an output video frame at the region position.

Figure 11:
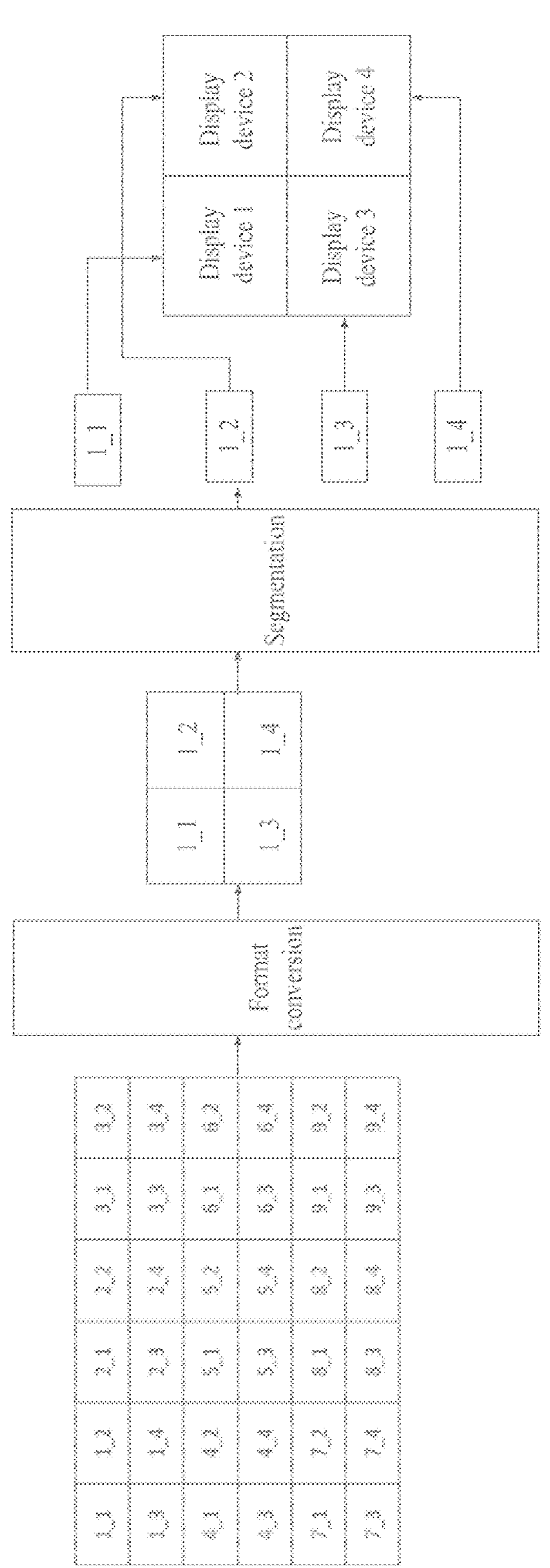
FIG. 11 is a schematic diagram illustrating performing video processing on a three-dimensional video in an embodiment of the present disclosure.

If the video format of the input video frame is a three-dimensional video format, and the video format of the output video frame is a two-dimensional video format, then the video processing logic may be a viewpoint segmentation processing, a format conversion processing and a segmentation processing. Reference is made to FIG. 11, which is a schematic diagram illustrating performing video processing on a three-dimensional video. As shown in FIG. 11, sub-video frames corresponding to a respective one of the plurality of viewpoints may be extracted from the input video frame, and a sub-video frame may be understood as an image under a viewing angle, then a sub-video frame of a viewpoint can be extracted; the extracted sub-video frame of the viewpoint is a video frame in a two-dimensional video format, and then the extracted sub-video frame of the viewpoint is subjected to a segmentation processing according to the number and splicing manner of the display devices to obtain a plurality of output video frames.

According to a third video processing logic, it is necessary to perform a format conversion on the input video frame and perform a super-resolution processing on the resolution of the input video frame.

Figure 12:
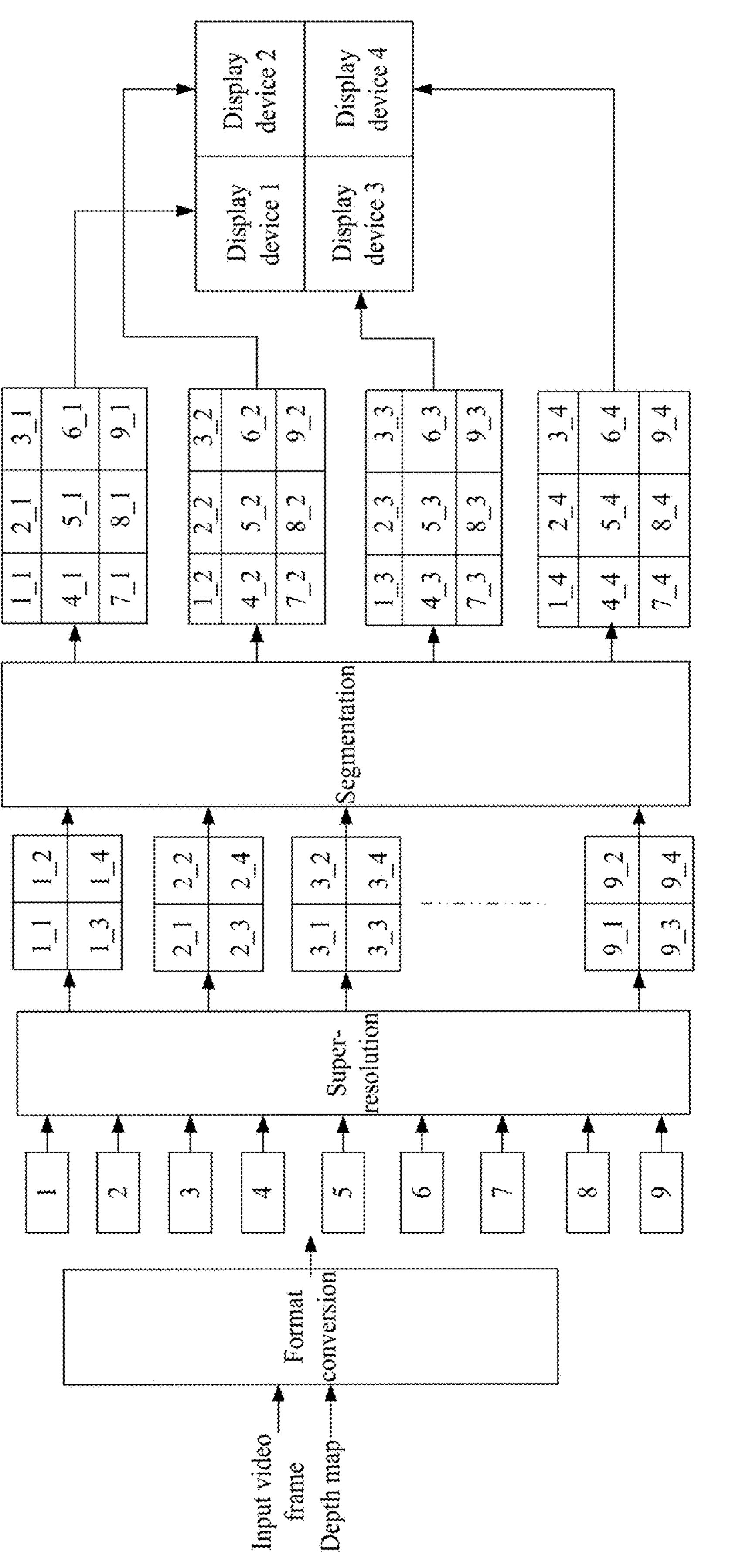
FIG. 12 is a schematic diagram illustrating performing video processing on a two-dimensional video in an embodiment of the present disclosure.

The video format of the input video frame is a two-dimensional video format, and the video format of the output video frame is a three-dimensional video format, and the video processing logic may be format conversion processing, super-resolution processing, and segmentation processing in sequence. Reference is made to FIG. 12, which is a schematic diagram illustrating a process of performing video processing on a two-dimensional video. As shown in FIG. 12, a plurality of viewpoints and sub-video frame of each viewpoint are restored according to an input video frame and a depth map corresponding to the input video frame, so as to convert the input video frame in the two-dimensional video format into a first video frame in the three-dimensional video format; next, at least one circle of pixels with a pixel value of 0 are expanded outside the edge of the sub-video frame of each viewpoint, and then the padded sub-video frame of each viewpoint is fed into the repair model to obtain sub-video frames with a high resolution; and then pixel rearrangement is performed on the sub-video frames with the high resolution to obtain a plurality of output video frames.

Figure 13:
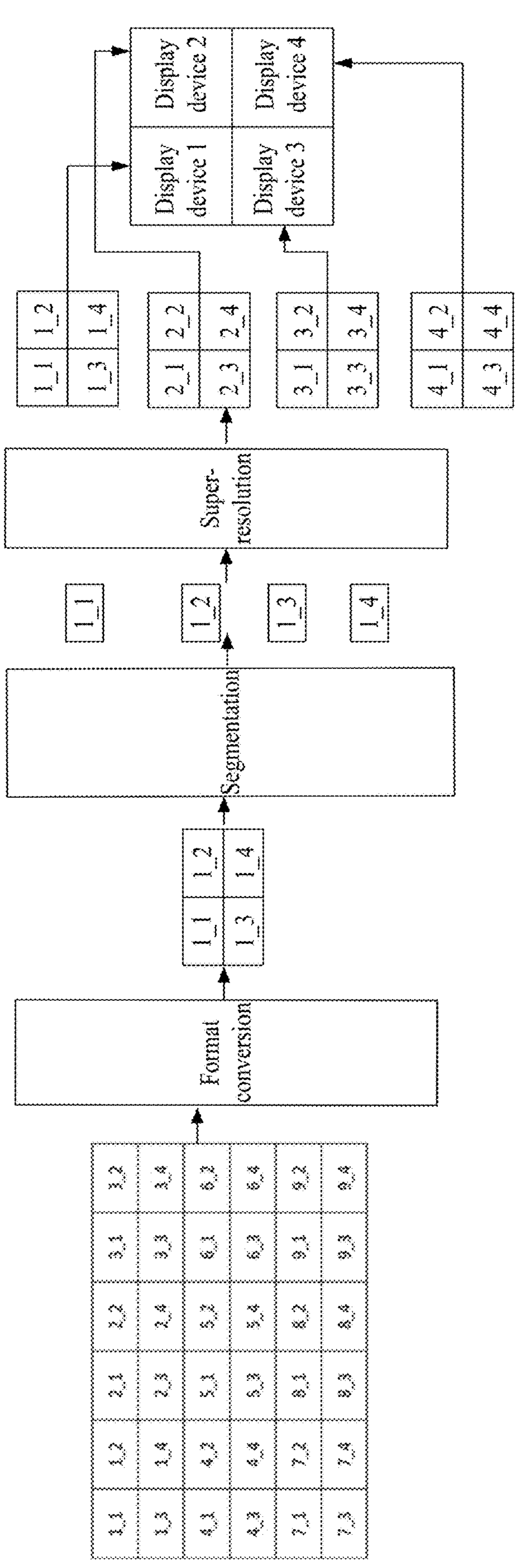
FIG. 13 is a schematic diagram illustrating performing video processing on a two-dimensional video in an embodiment of the present disclosure.

The video format of the input video frame is a three-dimensional video format, and the video format of the output video frame is a two-dimensional video format, then the video processing logic may be format conversion processing, segmentation processing, and super-resolution processing in sequence. Reference is made to FIG. 13, which is a schematic diagram illustrating a process of performing video processing on a two-dimensional video. As shown in FIG. 13, sub-video frames corresponding to a plurality of viewpoints can be extracted from the input video frame, a sub-video frame can be understood as an image under a viewing angle, then a sub-video frame of a viewpoint can be extracted; the extracted sub-video frame of the viewpoint is a first video frame in a two-dimensional video format; then, the first video frame is subjected to segmentation processing according to the number and splicing manner of the display devices to obtain a plurality of sub-video frames; the plurality of sub-video frames are then fed into the repair model to obtain a plurality of output video frames with a high resolution.

In some embodiments, after a plurality of output video frames are displayed on a plurality of display devices, the display parameters of the input video frames may also be adjusted so that the video format and resolution at the time when the video is displayed may be continuously adjusted as needed during playing.

To adjust the efficiency of the display parameter of an output video frame, a plurality of input video frames and output video frames corresponding to the plurality of input video frames can be cached, so that the output video frames can be displayed in sequence according to a frame sequence of the output video frames; then, when it is detected that the display parameters are adjusted, the object to be processed can be extracted from the cache first, whereby the problem of reduced efficiency caused by reacquiring a new input video frame can be avoided.

In response to detecting that a display parameter is adjusted, it can be determined whether an object of video processing is a cached input video frame or a cached output video frame; that is, it is determined whether to process a cached input video frame or a cached output video frame. If it is a cached input video frame, which represents to perform video processing on the video frame in the original video according to the process of the above-mentioned embodiment; and if it is a cached output video frame, the video processing is performed based on the cached output video frame; since the cached output video frame has processed the input video frame according to the display parameters after the display parameters are adjusted, the video processing on the cached output video frame can be regarded as continuous video processing, and the step of processing the input video frame as the output video frame is omitted, thereby improving the adjustment efficiency.

In a specific implementation, the adjusted display parameters can be acquired in response to the adjustment of the display parameter, and the target video frame to be adjusted is determined based on the change of the display parameter before and after the adjustment; the target video frame is processed to obtain a video frame complying with the adjusted display parameters.

The target video frame is a cached input video frame or a cached output video frame.

In the embodiment, if the display parameter is adjusted, it can determine whether an input video frame and a plurality of output video frames corresponding to each input video frame are cached when it is detected that the display parameter is adjusted; if so, the target video frame can be determined from the cached video data; and if not, the current incoming input video frame needs to be processed according to the adjusted display parameters.

When the target video frame is determined from the cached video data, an input video frame or an output video frame can be taken directly from the cache as an object to be processed, improving the taking efficiency; in the process of processing a cached target video frame, a newly arrived input video frame can be cached; if the target video frame is an output video frame, the newly arrived input video frame can be processed according to the original display parameters, and the video frame obtained after the processing can be cached as the target video frame to reprocess the target video frame according to the new display parameters; in this manner, after the display parameter is changed, it can make the transition of processing changes to the input video frame smoother, and reduce the image stuttering caused by the display parameter switching.

Here, a description of changes in display parameters will be illustrated:

In a first case, based on a display parameter change caused by a user operation, for example, display parameter of the input video being set, by the user, to change from one display parameter to another display parameter, the user can send a change instruction of the display parameter, and the change instruction carries the changed display parameter.

In a second case, display parameters change based on the change of the display device. For example, the input video frame needs to be switched from one splicing screen to another splicing screen for play, for example from a 4K splicing screen to an 8K splicing screen. Because of the change in display performance of the display device of the splicing screen, the display parameters have changed. At this time, when it is detected that the splicing screen on which the input video frame is played changes, it indicates that the display parameters have changed, the display parameters of the changed splicing large screen can be obtained.

In a third case, based on the change of a display image of an input video frame of a video stream, in this case, an image identifier can be carried in each input video frame, and the image identifier is used for characterizing whether the image of the input video frame needs fuzzification processing; if the image identifier is 1, it characterizes that the image of the input video frame needs fuzzification processing, and if the image identifier is 0, it characterizes that the image of the input video frame does not need fuzzification processing; if fuzzification processing is required, it indicates that the resolution of the input video frame needs to be changed during display, and then the display parameters change.

In view of the change of the display parameters, it can be known that the display parameters may change in resolution, and may also change in video format, and may also change in both resolution and video format, and may also change in the number and splicing manner of the display devices; for different changes, the target video frame processed may be slightly different.

For example, in the case where the change characterizes resolution changes, a cached output video frame can be taken as a target video frame; in the case where the change characterizes non-resolution changes, the cached input video frame may be taken as the target video frame.

Specifically, when the resolution changes, only the resolution needs to be adjusted and the video format and segmentation processing need not be adjusted, the resolution can be directly adjusted on the output video frame, and then the target video frame can be the output video frame; in this way, the output video frame can be directly reprocessed to improve the output efficiency of a new output video frame after the display parameter changes, thereby avoiding image stuttering.

Specifically, if there is a change in non-resolution, such as a change in video format or a change in segmentation manner, the format change needs to be performed starting from the original input video frame, and therefore the target video frame may be a cached input video frame.

For example, if the target video frame is the cached output video frame, the resolution of the cached output video frame can be processed according to the adjusted display parameters, and the output video frame with changed resolution can be obtained; if the target video frame is the cached input video frame, at least one image processing can be performed on the cached input video frame according to the display parameters; for example, the format conversion processing is carried out, and the video frames obtained after the format conversion processing are subjected to segmentation processing to obtain a plurality of new output video frames; format conversion processing is used for converting the input video frame into a video frame that conforms to the changed video format.

In the example, if the display parameter characterizes a resolution change, the resolution of the cached output video frame that is not displayed is processed, and the processing may include super-resolution processing and low-resolution processing; the super-resolution processing is used for improving the resolution of the output video frame. For example, a video needs to be played from one splicing large screen to another splicing large screen, and the resolution of the splicing large screen after the transfer is relatively high, and the number and splicing manner of the display devices do not change, then super-resolution processing can be performed on an output video frame to be played; the method of the super-resolution processing can be seen in the process described in the above-mentioned embodiment, so that a new output video frame is obtained after the super-resolution processing, and the new output video frame can be sent to the new splicing large screen for playing.

For another example, an input video frame to be played in a video carries an image identifier of 1, and fuzzification processing needs to be performed on the input video frame to be played, then a target video frame is an output video frame with an image identifier of 1; in this case, the resolution of the output video frame can be reduced to a pre-set resolution, then fuzzification processing can be performed on the output video frame, so that the output video frame reduces the clarity due to a low resolution, thereby protecting the privacy of some images in the video, obtaining a new output video frame after fuzzification, and directly displaying the new output video frame on a display device; until the output video frame with the image identifier 0 is reached, the original video processing logic begins to revert.

In the example, if the display parameter includes a frequency format change, regardless of whether the resolution changes, the target video frame can be a cached input video frame, for example, the video format of the output video frame changes from 2D to 3D, or changes from 3D to 2D; at this moment, if image processing is performed on the output video frame, the format conversion processing needs to be performed on a plurality of output video frames, and the processing is relatively complicated and has a low efficiency; thus, the input video frames can be subjected to image processing according to the changed display parameters. Specifically, the process of performing image processing on the input video frame according to the changed display parameters may be to perform segmentation processing on the video frame obtained after the format conversion processing to obtain a new plurality of output video frames. Specifically, it can refer to the process described in the above-mentioned embodiments, and will not be described in detail herein.

For example, a video needs to be switched from one splicing large screen to another splicing large screen for playing; the switched splicing large screen is a 3D autostereoscopic display large screen capable of implementing 3D display, while the previous splicing large screen cannot implement autostereoscopic 3D display; then the video format in the display parameters can be converted from a 2D video format to a 3D video format, and the number and splicing manner of the display devices have not changed; in this case, according to the video processing logic shown in FIG. 11, an input video frame to be played in a cache can be subjected to format conversion first according to the 3D video format, and then to segmentation processing. Alternatively, as shown in FIG. 13, the input video frame to be played in the cache is first subjected to format conversion according to the 3D video format, then subjected to super-resolution processing, and then subjected to segmentation processing.

For another example, the video needs to be switched from one splicing large screen to another splicing large screen for playing; the switched splicing large screen is a 2D autostereoscopic display large screen, while the previous splicing large screen can perform an autostereoscopic 3D display; then the video format in the display parameters can be converted from a 3D video format to a 2D video format, and the number and splicing manner of the display devices have not changed; in this case, according to the video processing logic shown in FIG. 12, the input video frame to be played in the cache can be first subjected to format conversion according to the 2D video format, and then to segmentation processing. Alternatively, as shown in FIG. 10, the input video frame to be played in the cache is first subjected to format conversion according to the 2D video format, then subjected to segmentation processing, and then subjected to super-resolution processing.

For example, if the display parameter includes changes in the number or splicing manner of the display devices, it is characterized that the splicing large screen played changes, and a corresponding change in the segmentation processing on the input video frame is required, the cached input video frame to be played can be taken as a target video frame, and then image processing is performed on the target video frame according to the process described in the above-mentioned embodiment.

Figure 14:
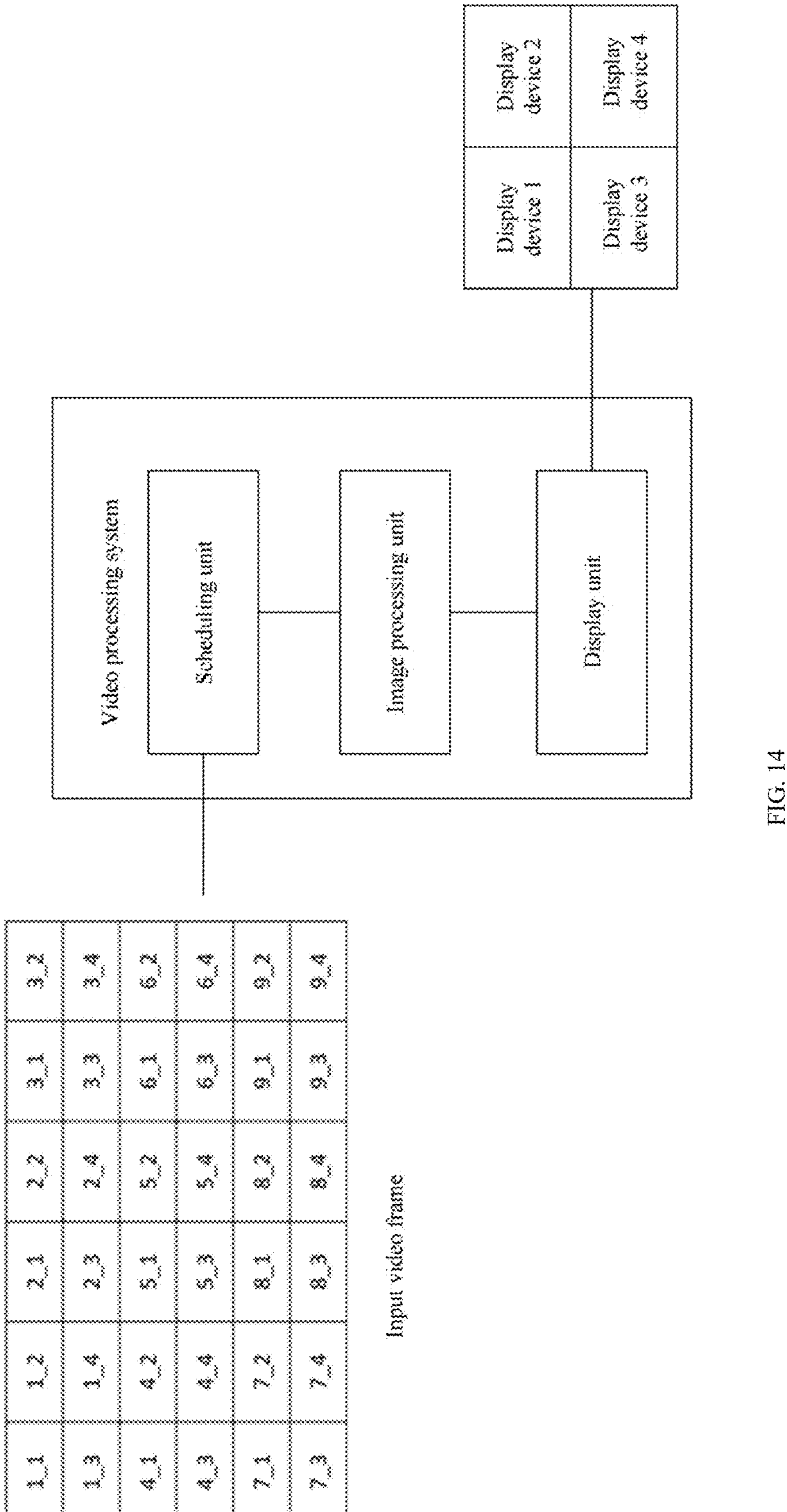
FIG. 14 is a schematic framework structural diagram of a video processing system in an embodiment of the present disclosure.

Based on the same creative concept, the present disclosure also provides a video processing system, referring to FIG. 14, which is a schematic framework structural diagram of a video processing system. As shown in FIG. 14, the video processing system is used for performing the video processing method described above. Specifically, a scheduling unit, an image processing unit, and a display unit may be included.

The scheduling unit is configured to schedule an input video frame to the image processing unit.

The image processing unit is configured to process the input video frame into a plurality of output video frames based on the display parameters of the input video frame when the input video frame is displayed; one output video frame corresponds to a partial region on the input video frame, and the display parameters include at least one of a video format and a resolution.

The display unit is configured to display the plurality of output video frames on a plurality of display devices so that the output video frames are displayed according to the display parameters.

In the embodiment, the display unit may be monitoring hosts connected to various display devices, and each display device is connected to one monitoring host, then the display unit may send a plurality of output video frames to a plurality of monitoring hosts respectively, and the monitoring hosts enable the received output video frames to be displayed on the display devices.

Here, the description of the input video frame and the display parameters may refer to the description in the embodiment of the video processing method, which will not be described in detail herein.

With the technical solution of such an embodiment, since the image processing unit processes the input video into a plurality of output video frames according to the display parameters, the display unit can split and display the input video frames on a plurality of display devices, thereby realizing the split display of the video. Since the display parameters include at least one of a video format and a resolution, when the video is split for display, the input video frame can be processed into a video frame complying with the expected video format, or into a video frame complying with the expected resolution, or into a video frame complying with both the expected video format and the expected resolution, so that the input video frames with different video formats and resolutions can be played according to the expected display parameters, thereby enabling the plurality of display devices to adapt to various types of videos, and achieving the effect of performing general playing on various types of videos.

Figure 15:
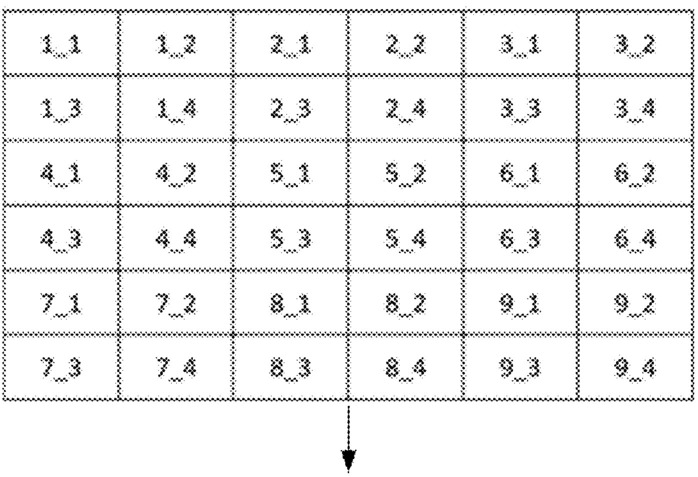
FIG. 15 is a schematic framework structural diagram of another video processing system in an embodiment of the present disclosure.
Figure 15:
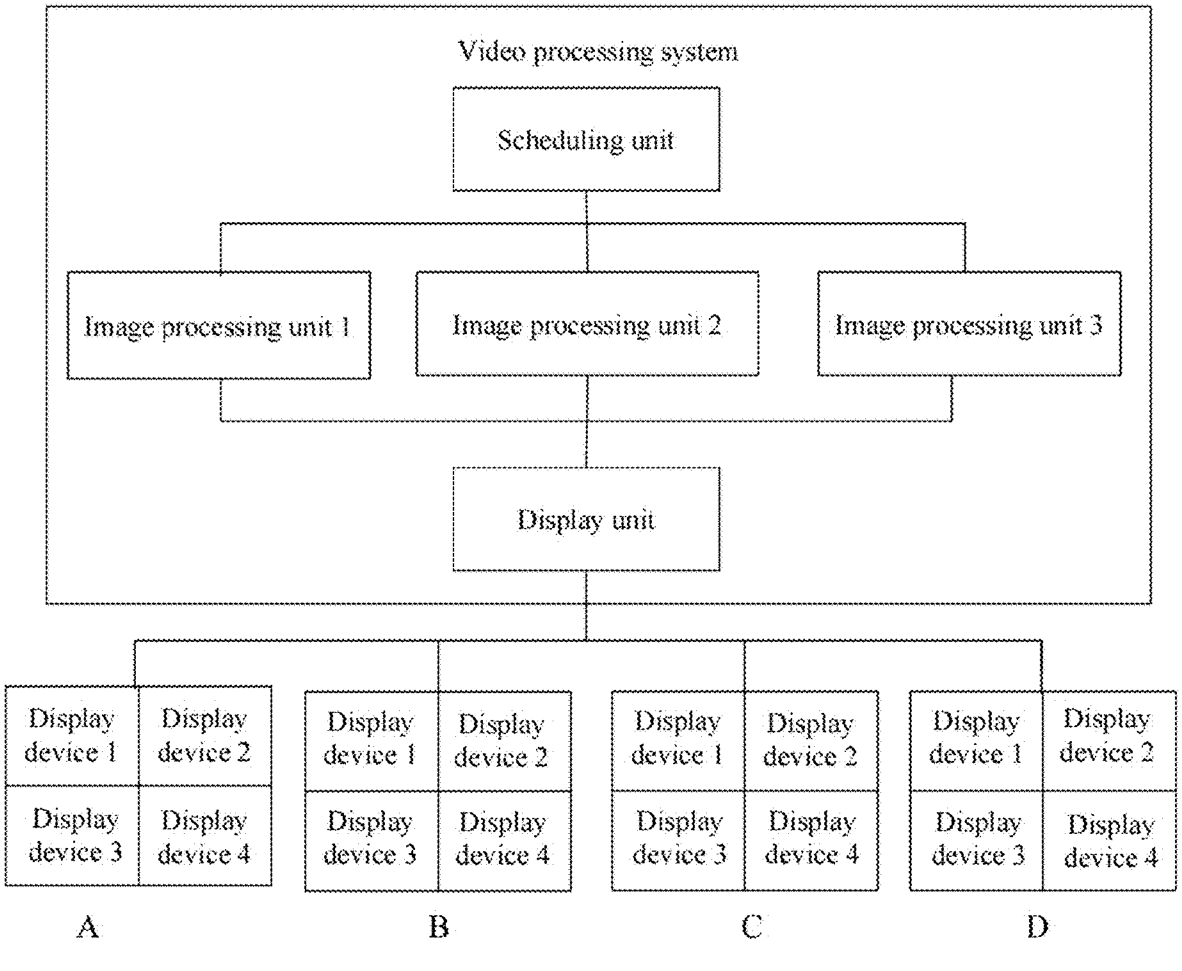

Reference is made to FIG. 15, which is a schematic framework structural diagram of another video processing system of the present disclosure. As shown in FIG. 15, the video processing system may further include a plurality of playing modules; the playing modules include a plurality of display devices, and the plurality of display devices are spliced with each other; the display unit is configured to send a plurality of output video frames to at least one playing module, so that the playing module displays the plurality of output video frames to a plurality of display devices, respectively.

Specifically, a plurality of display devices are spliced with each other to obtain a splicing large screen; the playing module may further include the above-mentioned monitoring host. As shown in FIG. 1, each playing module may include a plurality of monitoring hosts and a display device connected to each monitoring host; that is, a playing module is configured to splice and display the video frames.

Each playing module is connected to the image processing unit, allowing an input video frame to be spliced and displayed on at least one playing module. For example, as shown in FIG. 15, after the input video frame is processed into a plurality of output video frames according to the display parameters, the plurality of output video frames can be sent to at least one playing module at the same time, so that the at least one playing module can obtain a plurality of output video frames at the same time, and the video can be displayed on a plurality of splicing large screens at the same time.

For example, the display performances possessed by a plurality of playing modules and the number of spliced display devices may differ, and the display performances may include the physical resolution and display capabilities of the display devices in the playing modules. The display capability may refer to a 3D display capability and a 2D display capability. As stated above, if one display device is an autostereoscopic 3D display device, autostereoscopic 3D display of a video to be displayed can be achieved, and a user can view a video in stereoscopic display without using an auxiliary viewing tool; if a display device does not have autostereoscopic 3D display capability, it has 2D display capability; in the case where the video to be displayed is a 3D video, the display device can only display in 2D form, and the user needs to use an auxiliary viewing tool, such as 3D glasses, to view the video in stereoscopic display.

If the number of spliced display devices is different, the number of output video frames that need to be segmented from the input video frames is different, and the segmentation manners are also different.

Accordingly, the display parameter of the input video frame when displayed can be determined according to the display performance of the display device in the playing module and the number of the spliced display devices, and if the physical resolution of the display device is high and there is 3D display capability, the display parameter can be used for indicating to convert the input video frame into 3D video and improve the resolution of the input video frame. If the physical resolution of the display device is high and there is no 3D display capability, then the display parameter may be used for indicating to improve the resolution of the input video frame. If the physical resolution of the display device is high and there is no 3D display capability, but the display parameter may also be used for indicating to improve the resolution of the input video frame and to convert the input video frame into 3D video.

The display parameters corresponding to the playing modules with different numbers of display devices are also different.

Thus, the display parameters corresponding to a plurality of playing modules may differ, and as described in the above-mentioned embodiment of the video processing method, a video processing logic for performing video processing on an input video frame may be determined in combination with the input parameters and the display parameters of the input video, and as mentioned above, a first type of video processing logic, a second type of video processing logic, and a third type of video processing logic are included. When there is a difference in the display parameters corresponding to a plurality of playing modules, when the same input video frame needs to be displayed on a plurality of playing modules, there is a difference in the video processing logic for the plurality of playing modules.

To cope with differences between playing modules, a plurality of image processing units may be included in the video processing system, and different image processing units may correspond to playing modules spliced by different numbers of display devices and/or to playing modules spliced by display devices with different display performances. Specifically, different image processing units may correspond to different numbers of display devices, or to playing modules spliced by display devices with different display performances; alternatively, different image processing units may correspond to both different numbers of display devices and playing modules spliced by display devices with different display performances.

Accordingly, when the same input video frame is input to the video processing system, it is possible to determine at least one target playing module on which the input video frame is to be displayed and send the input video frame to an image processing unit respectively corresponding to the at least one target playing module, so that the input video frame is processed in the image processing unit.

For example, if different image processing units correspond to playing modules spliced by different numbers of display devices, one image processing unit aims at the playing modules spliced by the same number of display devices; if different image processing units correspond to playing modules spliced by display devices with different display performances, one image processing unit aims at a playing module spliced by a display device with the same display performance, and in this case, the video processing logic of different image processing on an input video frame may be different.

For example, as shown in FIG. 15, four groups of playing modules are included; playing module A and playing module B both include four display devices, and the display performances of the eight display devices are the same, for example, both being 8K splicing large screens, then the playing module A and the playing module B correspond to the same image processing unit 1; the playing module C includes three display devices, and all the three display devices can realize autostereoscopic 3D display, then the playing module C corresponds to the image processing unit 2; the playing module D includes nine display devices, and then the playing module D corresponds to the image processing unit 3.

When a video needs to be played on the playing module A, the playing module B, and the playing module C, the scheduling unit sends incoming input video frames in the video to the image processing unit 1 and the image processing unit 2; after processing the input video frames according to the above-mentioned first video processing logic, the image processing unit 1 would send the plurality of output video frames to the playing module A and the playing module B at the same time; the image processing unit 2 processes the input video frames according to the second video processing logic or the third video processing logic mentioned above, and then sends the plurality of output video frames to the playing module C at the same time.

In some embodiments, the image processing unit may include a plurality of image processing modules, different image processing modules being configured to perform different image processing, and the plurality of image processing modules may at least include a segmentation module and a super-resolution module.

As described above, when processing an input video frame based on an input parameter and a display parameter, different combinations of the input parameter and the display parameter thereof may have different video processing logics, and under the different video processing logics, the image processing to be performed and the execution order between the image processing differ. In this case, the scheduling unit may be configured to determine at least one target image processing module to be scheduled and an execution order between the target image processing modules among the plurality of image processing modules based on the input parameter and the display parameter of the input video frame; and in the scheduling process, the video frame processed by the previous target image processing module is scheduled to the next target image processing module according to the execution order; the scheduled target image processing module includes a segmentation module, and the segmentation module is configured to segment a video frame input to the segmentation module into a plurality of sub-video frames, and the plurality of sub-video frames correspond to a plurality of output video frames, respectively.

Figure 16:
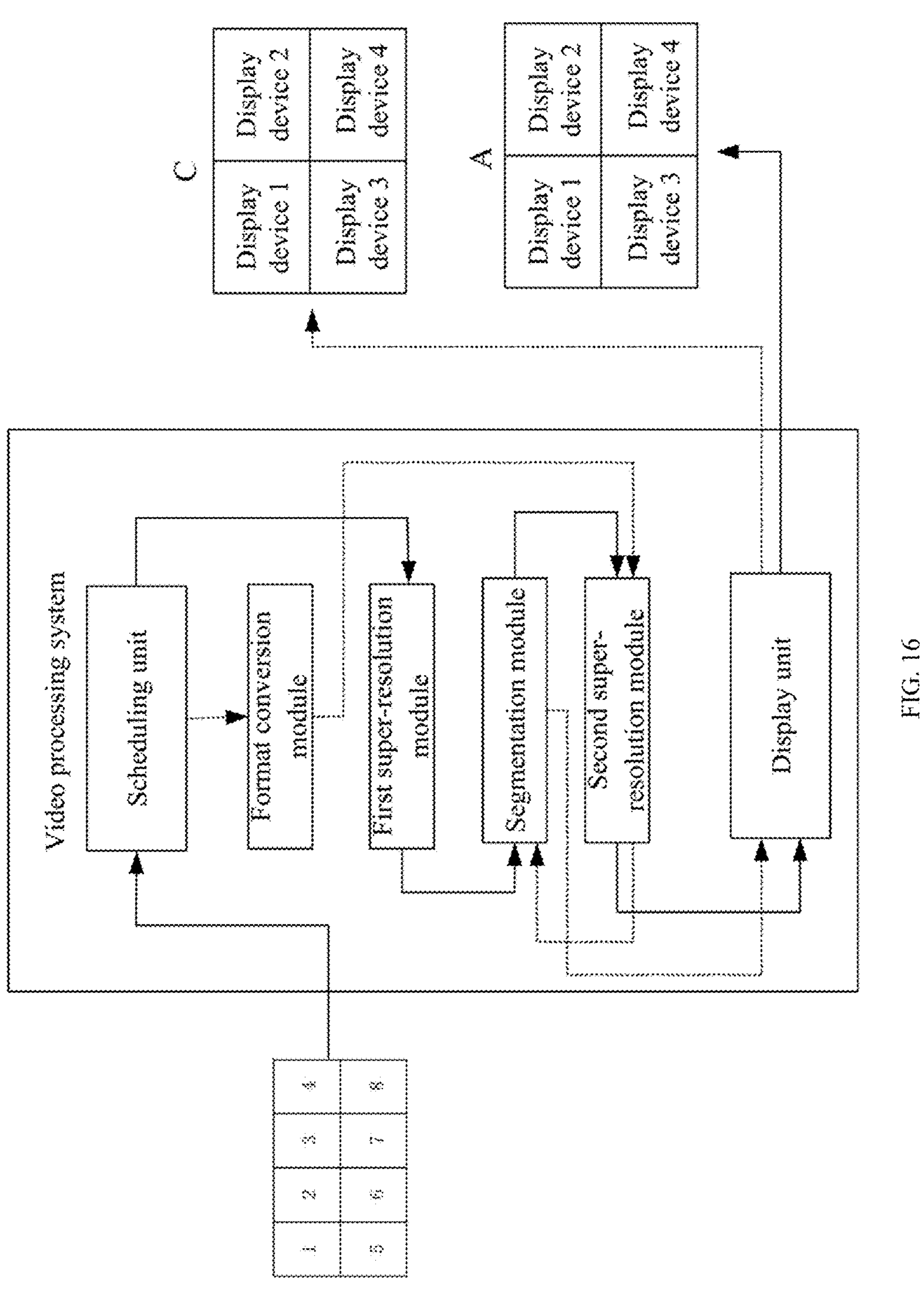
FIG. 16 is a schematic framework structural diagram of still another video processing system in an embodiment of the present disclosure.

Reference is made to FIG. 16, which is a schematic framework structural diagram of still another video processing system of the present disclosure. As shown in FIG. 16, an image processing unit includes a plurality of image processing modules, and different image processing modules are configured to execute different image processing; when an input video frame arrives, corresponding video processing logic can be determined according to a display parameter and an input parameter; and a target image processing module to be scheduled and execution order between the target image processing modules is determined according to the video processing logic, and the execution order between target image processing modules characterizes the execution order between image processing.

For example, when the video format of an input video frame is different from the video format of an output video frame, format conversion needs to be performed on the input video frame, and if super-resolution processing is not needed, the target image processing module includes a format conversion module and a segmentation module; the scheduling order of the format conversion module is located before that of the segmentation module, and the format conversion module is configured to convert an input video frame into a video frame complying with the video format in the display parameters.

For example, taking the above-mentioned second video processing logic as an example, format conversion processing and segmentation processing need to be performed on an input video frame, first format conversion and then segmentation processing; then a scheduling unit can schedule the input video frame to the format conversion module first, and then schedule the output of the format conversion module to the segmentation module when scheduling.

For example, the display parameter includes a video format and a resolution, and in the case where the resolution of the input video frame is lower than the resolution of the output video frame, the target image processing module further includes a super-resolution module, and the super-resolution module is configured to perform pixel expansion on a video frame input to the super-resolution module.

The scheduling unit is also configured to determine an execution order between the super-resolution module and the segmentation module based on the video format of the input video frame.

In the case where the video format of the input video frame is a two-dimensional video format and the video format of the output video frame is a three-dimensional video format, the execution order of the super-resolution module is better than that of the segmentation module.

In the case where the video format of the input video frame is a two-dimensional video format and the video format of the output video frame is a two-dimensional video format, the execution order of the super-resolution module lags behind that of the segmentation module.

Taking the above-mentioned first video processing logic as an example, if it is not necessary to perform format conversion on an input video frame and it is necessary to perform super-resolution processing and segmentation processing on the input video frame, the execution order of the super-resolution processing and segmentation processing can be determined according to the format of the input video frame. As shown in FIG. 9, the input video frame is in a 2D video format, then it can be determined that the execution order of the segmentation module is higher than that of the super-resolution module, then the scheduling unit can schedule the input video frame to the segmentation module first, and then schedule the output of the segmentation module to the super-resolution module when scheduling. As shown in FIG. 10, the input video frame is a 3D video format, and it can be determined that the execution order of the super-resolution module is higher than that of the segmentation module, then the scheduling unit can schedule the input video frame to the super-resolution module first, and then schedule the output of the segmentation module to the segmentation module when scheduling.

For example, the segmentation module includes a first segmentation module and a second segmentation module; the first segmentation module is configured to perform image segmentation on a video frame of an input two-dimensional video according to a splicing manner of a plurality of display devices.

The second segmentation module is configured to extract a sub-video frame belonging to each viewpoint from a video frame of an input three-dimensional video and divide a plurality of pixels in the sub-video frame of each viewpoint according to the splicing manner of the plurality of display devices to obtain pixels included in different region positions of each viewpoint, and splice pixels belonging to a same region position in a plurality of viewpoints.

The segmentation module may include a first segmentation module corresponding to a video frame in a two-dimensional video format, and a second segmentation module corresponding to a video frame in a three-dimensional video format; the processing manner of the video frame by the first segmentation module may be illustrated in FIG. 9, and the processing method of the video frame by the second segmentation module may be illustrated in FIG. 10, that is to say, the scheduling unit may schedule the video frame in the two-dimensional video format to be processed to the first segmentation module, and schedule the video frame in the three-dimensional video format to the second segmentation module.

For example, in the case where the output video frame is in a three-dimensional video format and the input video frame is in a two-dimensional video format, the format conversion module is configured to generate a plurality of sub-video frames of different viewpoints of the input video frame based on the input video frame and a depth map corresponding to the input video frame, the sub-video frame of each viewpoint including pixels at a plurality of positions of the viewpoint.

For example, the super-resolution module includes a first super-resolution module and a second super-resolution module; the first super-resolution module is configured to interpolate at least one circle of pre-set pixels at an edge of an input video frame, a pixel value of the pre-set pixel being a pre-set value; and the second super-resolution module is configured to perform the pixel expansion on the video frame output by the first super-resolution module.

As stated in the above-mentioned embodiment, in the case where an input video frame is a two-dimensional video format and an output video frame is also a two-dimensional video format, if super-resolution processing is required, the input video frame can be subjected to padding processing first, the padded input video frame is subjected to segmentation processing, and the segmented sub-video frame is further subjected to padding processing, i.e. two padding are included; then the padding for the input video frame can be performed by a first super-resolution module, and the padding for the segmented sub-video frame can be performed by a second super-resolution module, then the scheduling unit can schedule the input video frame to the first super-resolution module first, then schedule the output of the first super-resolution module to the segmentation module, and then schedule the output of the segmentation module to the second super-resolution module, and schedule the output of the second super-resolution module to the display unit.

For example, as shown in FIG. 16, taking the example that an input video frame needs to be played on a playing module A and a playing module C, the playing module A and the playing module C correspond to different display parameters and then correspond to different video processing logics. As shown by a solid line arrow in FIG. 16, the playing module A corresponds to the first type of video processing logic; the scheduling unit schedules an input video frame to a first super-resolution module, and performs padding on the input video frame via the first super-resolution module; then, the input video frame after padding output by the first super-resolution module is scheduled to the segmentation module; the segmentation module segments the input video frame in a four-grid manner to obtain four sub-video frames; then, the scheduling unit schedules the four sub-video frames to a second super-resolution module; and the second super-resolution module improves the resolution of the sub-video frames and then outputs same. The output plurality of output video frames are sent to the playing module A.

As shown by a dashed arrow in FIG. 16, a playing module C corresponds to the third type of video processing logic; as shown by a dashed arrow in the drawing, the scheduling unit schedules an input video frame to a format conversion module, and the format conversion module restores a plurality of viewpoints and sub-video frames of each viewpoint according to the input video frame and a depth map corresponding to the input video frame; then, the scheduling unit schedules the sub-video frames of a plurality of viewpoints to a second super-resolution module, and the second super-resolution module extends at least one circle of pixels with a pixel value of 0 outside the edge of the sub-video frame of each viewpoint, and then sends the padded sub-video frame of each viewpoint to a repair model to obtain a sub-video frame with a high resolution; and then the scheduling unit schedules the sub-video frames of the plurality of viewpoints output by the second super-resolution module to the segmentation module, and the segmentation module performs pixel rearrangement on the sub-video frames with the high resolution to obtain a plurality of output video frames, and the output plurality of output video frames are sent to the playing module C.

Figure 17:
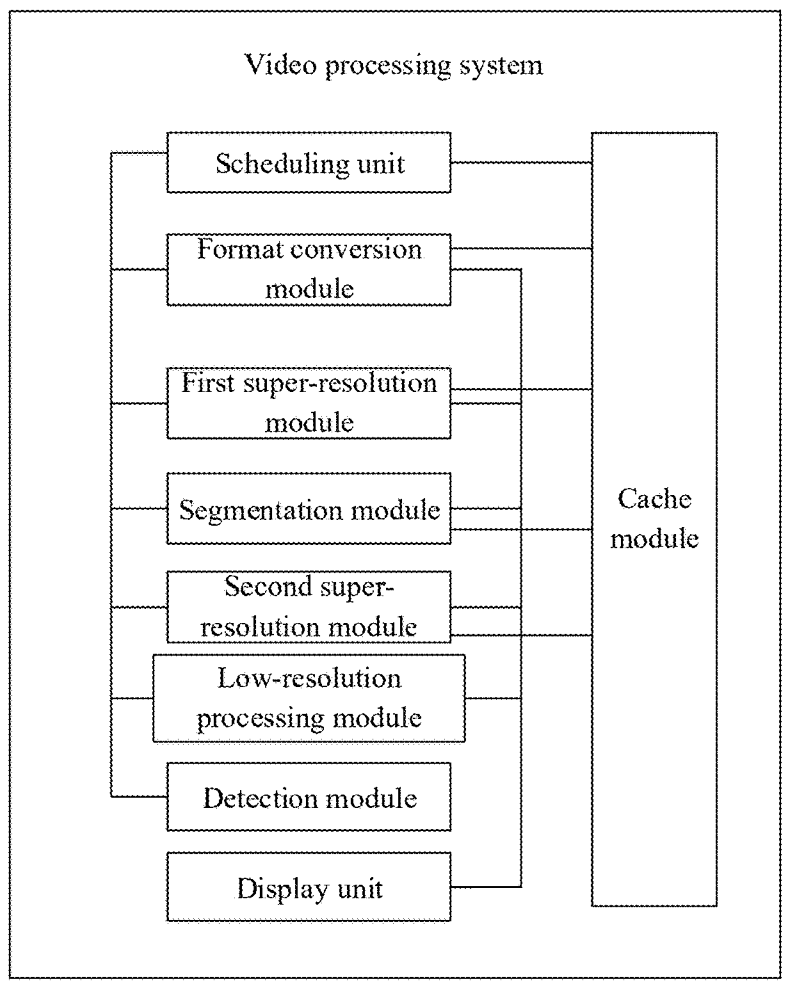
FIG. 17 is a schematic framework structural diagram of yet another video processing system in an embodiment of the present disclosure.

Referring to FIG. 17, a structural diagram of yet another video processing system is shown; as shown in FIG. 17, in an alternative example of the embodiment, a detection module can also be included; the detection module can be configured to detect a change in a playing module on which an input video frame is to be displayed and a change in an image identifier of the input video frame, and configured to monitor whether a parameter change instruction is received; if it is detected that the playing module changes, changed display parameter are generated according to the display performance, the number, and the splicing manner of the display devices in the changed playing module; if it is detected that the image identifier of the input video frame changes, changed display parameters are generated according to the current changed image identifier; in this case, if the image identifier changes from 0 to 1, the resolution in the display parameter changes from low resolution to high resolution; and if the image identifier changes from 1 to 0, the resolution in the display parameter changes from high resolution to low resolution.

If it is detected that a change instruction is received, the display parameter carried in the change instruction is taken as the changed display parameter.

In this case, the scheduling unit can compare the changes of the display parameters before and after the changes, and if the resolution changes, an output video frame to be played can be extracted from the cache module, and the output video frame is scheduled to the second super-resolution module to improve the resolution, or scheduled to the low-resolution processing module to reduce the resolution; if the video format changes, an input video frame to be played can be extracted from the cache module, and the input video frame is scheduled to the format conversion module, and then subsequent video scheduling can be performed according to the corresponding video processing logic.

Based on the same creative concept, the present disclosure also provides a video playback system, including a video processing module, and a display module group connected to the video processing module; the display module group is obtained by splicing a plurality of display devices, and a plurality of display module groups can be included; the video processing module can be configured to execute the above-mentioned video processing method.

Figure 18:
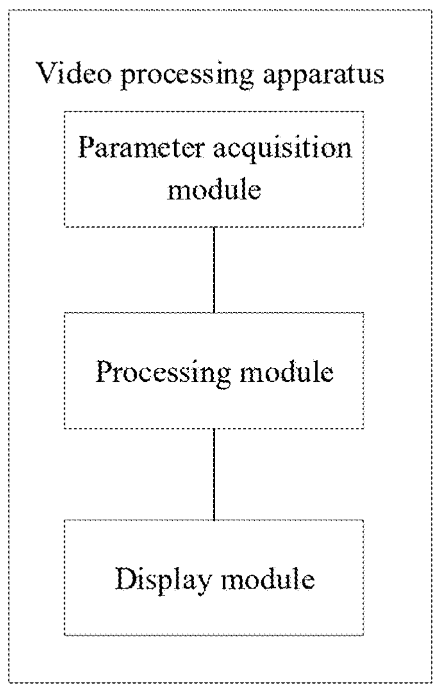
FIG. 18 is a schematic framework diagram of a video processing device in an embodiment of the present disclosure.

Based on the same creative concept, the present disclosure also provides a video processing device. Referring to FIG. 18, a framework diagram of the video processing device is shown. As shown in FIG. 18, the apparatus can be located at the video processing module of the above-mentioned video playback system, and specifically includes the following modules:

- a parameter acquisition module, configured to acquire an input video frame and display parameters of the input video frame when the input video frame is displayed, the display parameter including at least one of a video format and a resolution;
- a processing module, configured to process the input video frame into a plurality of output video frames based on the display parameters, where one output video frame corresponds to a partial region of the input video frame; and
- a display module, configured to display the plurality of output video frames on a plurality of display devices so that the plurality of output video frames are displayed according to the display parameters.

Optionally, the processing module includes:

- an input parameter acquisition unit, configured to acquire input parameters of the input video frame, the input parameter including at least one of the video format and the resolution; and
- an image processing unit, configured to perform at least one image processing on the input video frame in sequence based on the input parameters and the display parameters, the image processing including segmentation processing for segmenting a current video frame into a plurality of sub-video frames.

Optionally, the image processing unit specifically includes:

- a first processing unit, configured to perform, when the video format is different from the video format of the input video frame, format conversion processing on the input video frame, where the format conversion processing is used for converting the input video frame into a first video frame complying with the video format in the display parameters; and
- a second processing unit, configured to perform the segmentation processing on the first video frame to obtain the plurality of output video frames.

Optionally, the input video frame is in a two-dimensional video format, the video format of the output video frame is in a three-dimensional video format; the first processing unit is specifically configured to acquire a depth map corresponding to the input video frame and generate sub-video frames corresponding to a plurality of viewpoints based on a depth value corresponding to each pixel in the depth map and a pixel value corresponding to each pixel in the input video frame, where the sub-video frame corresponding to each viewpoint includes pixels of the viewpoint at a plurality of positions.

Optionally, the first video frame includes a plurality of viewpoints and pixels of each viewpoint at a plurality of positions; the second processing unit is specifically configured to divide a plurality of pixels included in each viewpoint according to a splicing manner of the plurality of display devices to obtain the pixels included in different region positions of each viewpoint and splice pixels belonging to the same region position in the plurality of viewpoints to obtain output video frames corresponding to the plurality of region positions.

Optionally, the display parameters include the resolution, the at least one image processing further includes super-resolution processing, and the image processing unit includes:

- an order determination sub-unit, configured to determine, when the resolution of the output video frame is higher than the resolution of the input video frame, an execution order between the segmentation processing and the super-resolution processing based on a video format of the output video frame, where the super-resolution processing is used for improving the resolution of the input video frame; and
- a third processing unit, configured to perform, when an execution order of the super-resolution processing comes, the super-resolution processing on an input second video frame according to the resolution of the output video frame, where the second video frame is an input video frame or a sub-video frame.

Optionally, the order determination sub-unit is specifically configured to determine that an execution order of the segmentation processing precedes the execution order of the super-resolution processing if the video format of the output video frame is a two-dimensional video format and determine that the execution order of the segmentation processing lags behind that of the super-resolution processing if the video format of the output video frame is a three-dimensional video format.

Optionally, the video format of the output video frame is a three-dimensional video format, the execution order of the segmentation processing lags behind that of the super-resolution processing; the third processing unit is configured to propose a sub-video frame belonging to each viewpoint from the second video frame, where the sub-video frame of each viewpoint includes pixels at a plurality of positions, and perform pixel expansion on pixels in sub-video frames of each viewpoint; the segmentation processing is used for rearranging pixels in the sub-video frames of the plurality of viewpoints after the pixel expansion according to a splicing manner of the plurality of display devices to obtain the output video frame.

Optionally, the execution order of the segmentation processing precedes that of the super-resolution processing; the third processing unit is configured to perform, for each sub-video frame in the plurality of sub-video frames, pixel expansion on pixels included in the sub-video frame to obtain an output video frame corresponding to each sub-video frame.

Optionally, the performing pixel expansion includes the following steps: interpolating, for each sub-video frame, at least one circle of first pixels outside a first edge of the sub-video frame to obtain an intermediate sub-video frame, a pixel value of the first pixel being a pre-set value; and performing the pixel expansion on pixels included in each intermediate sub-video frame.

Optionally, the video format of the input video frame is a two-dimensional video format, and the apparatus further includes:

a first padding module, configured to interpolate at least one circle of second pixels outside a second edge of the input video frame to obtain a third video frame, a pixel value of the second pixel being a pre-set value; and the second processing unit, specifically configured to perform the segmentation processing on the third video frame to obtain the plurality of sub-video frames, where the first edge is an edge in the sub-video frame except the second edge.

Optionally, a plurality of input video frames are provided, and the apparatus further includes:

a cache module, configured to cache the plurality of input video frames and output video frames corresponding to the plurality of input video frames to display the output video frames in sequence according to a frame sequence of the output video frames;

a change determination module, configured to determine, in response to an adjustment operation on the display parameters, a target video frame to be adjusted based on changes of the display parameters before and after the adjustment, where the target video frame is a cached input video frame or a cached output video frame; and a post-processing module, configured to process the target video frame to obtain a video frame complying with the adjusted display parameters.

Optionally, the change determination module is configured to take the cached output video frame as the target video frame in the case where the changes represent changes in the resolution, where the cached output video frame is an output video frame to be displayed at a current moment.

The change determination module is further configured to take the cached input video frame as the target video frame in the case where the changes represent changes in non-resolution.

Optionally, the post-processing module is specifically configured to process, if the target video frame is the output video frame, a resolution of the cached output video frame according to the adjusted display parameters to obtain an output video frame with a changed resolution; if the target video frame is the input video frame, format conversion processing is performed on the cached input video frame, and the segmentation processing is performed on the video frame obtained after the format conversion processing to obtain a new plurality of output video frames.

The format conversion processing is used for converting the cached input video frame into a video frame complying with a changed video format.

An embodiment of the video processing device of the embodiment is similar to the above-described embodiment of the video processing method, where relevant, refer to the embodiments of the above video processing method, and will not be repeated here.

Embodiments of the present disclosure also provide an electronic device storing computer programs that cause a processor to perform the video processing method according to the embodiments of the present disclosure.

Embodiments of the present disclosure further provide a computer readable storage medium storing computer programs that cause a processor to perform the video processing method according to the embodiments of the present disclosure.

Various embodiments in the specification are described in a progressive manner, each embodiment focuses on the difference from other embodiments, and the same and similar parts of various embodiments can be referred to each other.

Finally, it should be noted, relational terms such as "first" and "second" are used merely to distinguish an entity or operation from another entity or operation, and do not necessarily require or imply the existence of any such actual relationship or sequence between these entities or operations. Furthermore, the terms "comprising", "including" or any other variation thereof are intended to cover a non-exclusive inclusion, such that a process, method, article, or apparatus including a list of elements includes not only those elements but also other elements not expressly listed, or elements inherent to the process, method, article or apparatus. Without further limitations, an element defined by the phrase "comprising a . . . " does not exclude the presence of additional identical elements in the process, method, article or apparatus including said element.

The above is a detailed introduction to a video processing method and system, a video playback system, a device, an apparatus and a medium provided by the present disclosure. Specific examples are used here to illustrate the principles and implementation methods of the present disclosure. The description of the above embodiments is only used to help understand the method and its core idea of the present disclosure. Moreover, for those skilled in the art, there will be changes in the specific implementation and application scope based on the ideas of the present application. In summary, the content of this description should not be understood as a limitation of the present application.

Other embodiments of the present disclosure will be readily apparent to those skilled in the art from consideration of the specification and practice of the application disclosed herein. This application is intended to cover any variations, uses, or adaptations of the application that follow the general principles of this application and include common knowledge or customary technical means in the technical field that are not disclosed in this application. The specification and examples be considered as exemplary only, and a true scope and spirit of the application is indicated by the following claims.

It is to be understood that the present disclosure is not limited to precise structures described above and illustrated in the accompanying drawings, and that various modifications and changes may be made without departing from the scope thereof. The scope of the application is limited only by the appended claims.

"one embodiment", "an embodiment" or "one or more embodiments" as used herein means that a particular feature, structure, or characteristic described in connection with the embodiments is included in at least one embodiment of the present disclosure. In addition, please note that examples of the word "in one embodiment" herein do not necessarily all refer to the same embodiment.

In the description provided herein, numerous specific details are set forth. However, it is understood that embodiments of the present disclosure may be practiced without these specific details. In some instances, common methods, structures and techniques have not been shown in detail in order not to obscure the understanding of this description.

In the claims, any reference signs placed between parentheses shall not be construed as limiting the claims. The word "comprising/including" does not exclude the presence of elements or steps not listed in the claim. The word "a" or "an" preceding an element does not exclude the presence of a plurality of such elements. The disclosure may be implemented by means of hardware including several distinct elements and a suitably programmed computer. In a unit claim enumerating several devices, several of these devices may be embodied by the same hardware item. The words such as "first", "second", and "third" as used do not indicate any order. These words may be interpreted as names.

Finally, it should be noted that the above embodiments are only used to illustrate the technical solution of the present disclosure, but not to limit it; although the present disclosure has been described in detail with reference to the foregoing embodiments, those of ordinary skill in the art should understand that it can still be Modifications may be made to the technical solutions described in the foregoing embodiments, or equivalent substitutions may be made to some of the technical features; however, these modifications or substitutions do not cause the essence of the corresponding technical solutions to deviate from the spirit and scope of the technical solutions of the embodiments of the present disclosure.

The invention claimed is:

1. A video processing method, comprising:

acquiring an input video frame and display parameters of the input video frame when the input video frame is displayed, wherein the display parameters comprise at least one of a video format and a resolution;

processing the input video frame into a plurality of output video frames through image processing based on the display parameters, wherein each of the output video frames corresponds to a partial region of the input video frame, the image processing comprises a segmentation processing for segmenting a current video frame into a plurality of sub-video frames, and the plurality of sub-video frames correspond to the plurality of output video frames, respectively; and displaying the plurality of output video frames on a plurality of display devices respectively, so that the plurality of output video frames are displayed on a spliced large screen obtained by splicing the plurality of display devices according to the display parameters.

2. The method according to claim 1, wherein the processing the input video frame into a plurality of output video frames based on the display parameters comprises:

acquiring input parameters of the input video frame, wherein the input parameters comprise at least one of the video format and the resolution;

performing at least one image processing on the input video frame in sequence based on the input parameters and the display parameters;

wherein the current video frame is the input video frame or a video frame obtained by performing an image processing other than the segmentation processing on the input video frame.

3. The method according to claim 2, wherein the input parameters comprise the video format; the performing at least one image processing on the input video frame in sequence based on the input parameters and the display parameters comprises:

performing a format conversion processing on the input video frame when the video format of the output video frame is different from the video format of the input video frame, wherein the format conversion processing is used for converting the input video frame into a first video frame complying with the video format in the display parameters; and obtaining the plurality of output video frames by performing the segmentation processing on the first video frame.

4. The method according to claim 3, wherein a video format of the input video frame is a two-dimensional video format, a video format of the output video frame is a three-dimensional video format; and the performing a format conversion processing on the input video frame comprises:

acquiring a depth map corresponding to the input video frame; and generating sub-video frames corresponding to a plurality of viewpoints based on a depth value of each pixel in the depth map and a pixel value of each pixel in the input video frame, wherein the sub-video frame corresponding to each viewpoint comprises pixels at a plurality of positions for the viewpoint.

5. The method according to claim 3, wherein the first video frame comprises a plurality of viewpoints and pixels at a plurality of positions for each of the viewpoints; the obtaining the plurality of output video frames by performing the segmentation processing on the first video frame comprises:

dividing, according to a splicing manner of the plurality of display devices, a plurality of pixels comprised in each viewpoint to obtain pixels comprised in different region positions of each viewpoint; and splicing pixels belonging to the same region position in the plurality of viewpoints to obtain output video frames corresponding to a plurality of region positions respectively.

6. The method according to claim 2, wherein the display parameters comprise the resolution; the at least one image processing further comprises a super-resolution processing; and the performing at least one image processing on the input video frame in sequence based on the input parameters and the display parameters comprises:

determining execution orders of the segmentation processing and the super-resolution processing based on a video format of the output video frame when a resolution of the output video frame is higher than the resolution of the input video frame, wherein the super-resolution processing is used for improving the resolution of the input video frame;

performing, when the super-resolution processing is to be executed, the super-resolution processing on an input second video frame according to the resolution of the output video frame, wherein the second video frame is the input video frame or the sub-video frame.

7. The method according to claim 6, wherein the determining execution orders of the segmentation processing and the super-resolution processing based on a video format of the output video frame comprises:

determining that the execution order of the segmentation processing precedes the execution order of the super-resolution processing when the video format of the output video frame is a two-dimensional video format; and determining that the execution order of the segmentation processing lags behind that of the super-resolution processing when the video format of the output video frame is a three-dimensional video format.

8. The method according to claim 6, wherein the video format of the output video frame is a three-dimensional video format; an execution order of the segmentation processing lags behind that of the super-resolution processing; and the performing the super-resolution processing on an input second video frame comprises:

extracting a sub-video frame belonging to each viewpoint from the second video frame, wherein the sub-video frame of each viewpoint comprises pixels at a plurality of positions; and performing a pixel expansion on the pixels in the sub-video frame of each viewpoint;

wherein the segmentation processing is used for rearranging, according to a splicing manner of the plurality of display devices, the pixels in the sub-video frames of each viewpoint subjected to the pixel expansion to obtain the output video frame.

9. The method according to claim 6, wherein the video format of the output video frame is a two-dimensional video format; an execution order of the segmentation processing precedes the execution order of the super-resolution processing; and the performing the super-resolution processing on an input second video frame comprises:

for each sub-video frame in the plurality of sub-video frames, performing a pixel expansion on pixels comprised in the sub-video frame to obtain an output video frame corresponding to each sub-video frame.

10. The method according to claim 8, wherein the performing a pixel expansion comprises:

for each sub-video frame, interpolating at least one circle of first pixels outside a first edge of the sub-video frame to obtain an intermediate sub-video frame, wherein a pixel value of the first pixel is a pre-set value; and performing the pixel expansion on pixels comprised in each intermediate sub-video frame.

11. The method according to claim 10, wherein the video format of the input video frame is a two-dimensional video format; and before performing the pixel expansion, the method further comprises:

interpolating at least one circle of second pixels outside a second edge of the input video frame to obtain a third video frame, wherein a pixel value of the second pixel is a pre-set value; and performing the segmentation processing on the third video frame to obtain the plurality of sub-video frames;

wherein the first edge is an edge in the sub-video frame other than the second edge.

12. The method according to claim 1, wherein the input video frame comprises a plurality of video frames, and the method further comprises:

caching the plurality of input video frames and output video frames corresponding to each of the plurality of input video frames to display the output video frames in sequence according to a frame sequence of the output video frames; and the method further comprises:

in response to an adjustment operation on the display parameters, determining a target video frame to be adjusted based on changes of the display parameters before and after the adjustment, wherein the target video frame is a cached input video frame or a cached output video frame; and processing the target video frame to obtain a video frame complying with the adjusted display parameters.

13. The method according to claim 12, wherein the determining a target video frame to be adjusted based on changes of the display parameters before and after the adjustment comprises:

taking the cached output video frame as the target video frame when the changes represent changes in the resolution, wherein the cached output video frame is an output video frame to be displayed at a current moment; and taking the cached input video frame as the target video frame when the changes represent other changes other than the changes in the resolution.

14. The method according to claim 12, wherein the processing the target video frame to obtain a video frame complying with the adjusted display parameters comprises:

in response to the target video frame being the output video frame, processing a resolution of the cached output video frame according to the adjusted display parameters to obtain an output video frame with a changed resolution; and in response to the target video frame being the cached input video frame, processing the cached input video frame into a plurality of new output video frames based on the adjusted display parameters.

15. A video processing system, comprising:

a memory storing computer programs; and a processor, wherein the processor is configured to perform the computer programs to:

schedule an input video frame;

process the input video frame into a plurality of output video frames through image processing based on display parameters of the input video frame when the input video frame is displayed, wherein each output video frame corresponds to a partial region in the input video frame, and the display parameters comprise at least one of a video format and a resolution, the image processing comprises a segmentation processing for segmenting a current video frame into a plurality of sub-video frames, and the plurality of sub-video frames correspond to the plurality of output video frames, respectively; and display the plurality of output video frames on a plurality of display devices respectively, so that the output video frames are displayed on a spliced large screen obtained by splicing the plurality of display devices according to the display parameters.

16. A video playback system, comprising a video processing device, and a display device connected to the video processing device, wherein the display device is obtained by splicing a plurality of display units, and the video processing device is configured to execute the video processing method according to claim 1.

17. A video processing device, comprising a memory, a processor, and computer programs stored on the memory and executable on the processor, wherein the computer programs, when executed by the processor, implement the video processing method according to claim 1.

18. An electronic device, comprising a memory, a processor, and computer programs stored on the memory and executable on the processor, wherein the computer programs, when executed by the processor, implement the video processing method according to claim 1.

19. A non-transitory computer readable storage medium, wherein the computer readable storage medium is stored with computer programs that cause a processor to execute the video processing method according to claim 1.

* * * * *